US012725008B2

(12) United States Patent
Pramod et al.

(10) Patent No.: US 12,725,008 B2
(45) Date of Patent: Sep. 1, 2026

(54) TECHNIQUES FOR INPUT CLASSIFICATION AND RESPONSE USING GENERATIVE NEURAL NETWORKS

(71) Applicant: Oracle International Corporation, Redwood Shores, CA (US)

(72) Inventors: Siddharth Pramod, Brooklyn, NY (US); Samuel Bald, Valley Stream, NY (US)

(73) Assignee: Oracle International Corporation, Redwood Shores, CA (US)

( * ) Notice: Subject to any disclaimer, the term of this patent is extended or adjusted under 35 U.S.C. 154(b) by 1118 days.

(21) Appl. No.: 17/690,953

(22) Filed: Mar. 9, 2022

(65) Prior Publication Data

US 2023/0104757 A1 Apr. 6, 2023

Related U.S. Application Data

(63) Continuation-in-part of application No. 17/492,341, filed on Oct. 1, 2021.

(51) Int. Cl.

*G06N 3/045* (2023.01)
*G06N 3/044* (2023.01)
*G06N 3/08* (2023.01)

(52) U.S. Cl.

CPC ............ *G06N 3/045* (2023.01); *G06N 3/044* (2023.01); *G06N 3/08* (2013.01)

(58) Field of Classification Search

None
See application file for complete search history.

(56) References Cited

U.S. PATENT DOCUMENTS 7,657,626 B1 2/2010 Zwicky
2009/0024461 A1 1/2009 Willner et al.
(Continued)

FOREIGN PATENT DOCUMENTS

EP 3614645 A1 2/2020
JP 2019-532388 A 11/2019
(Continued)

OTHER PUBLICATIONS

"Attention Is All You Need," arXIv, 2017, Vaswani et al; Vaswani (Year: 2017).*
(Continued)

*Primary Examiner* — Michael J Huntley
*Assistant Examiner* — Paul J Breene
(74) *Attorney, Agent, or Firm* — Invoke

(57) ABSTRACT

Disclosed herein are techniques for detecting invalid web traffic. A method described herein involves obtaining an input sequence. The method further includes inputting the input sequence to an encoder model configured to generate an embedding from the input sequence. The method includes generating, as an output of the encoder model, an embedding. The method includes inputting the embedding to a classifier model configured to predict a vector of probability values corresponding to a plurality of classes using the embedding. A first class of the plurality of classes may be attributed to variable traffic and a second class of the plurality of classes may be attributed to repetitive traffic. The method includes predicting, as an output of the classifier, the vector of probability values. The method includes determining a machine-actor score from the vector of probability values. The method also includes outputting the machine-actor score.

22 Claims, 8 Drawing Sheets

(56) References Cited

U.S. PATENT DOCUMENTS

| | | | |
|---|---|---|---|
| 2019/0373000 A1 | 12/2019 | Garnett et al. | |
| 2020/0267057 A1* | 8/2020 | Garvey | H04L 41/0886 |
| 2022/0150262 A1 | 5/2022 | Hittel et al. | |
| 2025/0061485 A1 | 2/2025 | Taylor et al. | |

FOREIGN PATENT DOCUMENTS

| | | |
|---|---|---|
| JP | 2021-522622 A | 8/2021 |
| WO | 2016156513 | 10/2016 |
| WO | 2020050920 A1 | 3/2020 |

OTHER PUBLICATIONS

"Variational Autoencoder," Wikipedia, 2025 (Year: 2025).*
"SapiAgent: A Bot Based On Deep Learning to Generate Human-like Mouse Trajectories," IEEE, Antal et al; Antal (Year: 2021).*
"BeCAPTCHA: Behavioral Bot Detection using Touchscreen and Mobile Sensors benchmarked on HuMIdb," School of Engineering, Universidad Autonoma de Madrid, Spain, Acien et al; Acien (Year: 2020).*
Kim et al., Botnet Detection Using Recurrent Variational Autoencoder, IEEE, Apr. 1, 2020, 8 pages.
International Application No. PCT/US2022/021257, International Search Report and Written Opinion mailed on Aug. 4, 2022, 11 pages.
Notice of Allowance for European Patent Application No. 22715880.5, dated Jun. 20, 2025.
International Preliminary Report on Patentability for PCT Patent Application No. PCT/US2022/021257, dated Apr. 11, 2024.
"Intent-based Deep Behavioral Analysis: A Proprietary Bot Detection Technology", *Radware*, Available Online at: https://www.radware.com/WorkArea/DownloadAsset.aspx?ID=23b65631-1453-4949-ab49-d37b580a4c3b, Mar. 2019, 7 pages.
"Stop Digital Ad Fraud Eliminate Non-Human Ad Impressions and Improve Quality of Traffic", *Radware*, Shield Square, Available Online at: https://www.shieldsquare.com/prevent-digital-ad-fraud/, Accessed from Internet on Nov. 26, 2020, 4 pages.
"Ul Events", *W3C*, Available Online at: https://www.w3.org/TR/uievents/#events-mouseevents, Oct. 20, 2021, 115 pages.
Bishop, "Mixture Density Networks, Neural Computing Research Group Report", *Neural Computing Research Group Reports*: NCRG/94/4288, Feb. 1994, 26 pages.
Dash et al., "Auto-Detection of Click-Frauds using Machine Learning", *Indonesian Journal of Educational Science* (*IJES*), Available Online at: https://ijesc.org/upload/c85b77baa8fb8e66d83d5a80fd11a744.Auto-Detection%20of%20Click-Frauds%20using%20Machine%20Learning.pdf, Sep. 2020, pp. 27227-27235.
Gabryel, "Data Analysis Algorithm for Click Fraud Recognition", *International Conference on Information and Software Technologies*, Available Online at: https://www.researchgate.net/publication/327266122_Data_Analysis_Algorithm_for_Click_Fraud_Recognition, Aug. 2018, 10 pages.
Ha et al., "A Neural Representation of Sketch Drawings", *Neural and Evolutionary Computing*, Available online at: https://arxiv.org/pdf/1704.03477.pdf, May 19, 2017, 15 pages.
Ha et al., "Draw Together with a Neural Network", *Magenta*, Available Online at: https://magenta.tensorflow.org/sketch-rnn-demo, Accessed from Internet on Jan. 17, 2022, 5 pages.
Hochreiter et al., "Long Short-Term Memory", *Neural Computation*, vol. 9, No. 8, Nov. 1997, pp. 1735-1780.
Iqbal et al., "FCFraud: Fighting Click-Fraud from the User Side", *IEEE 17th International Symposium on High Assurance Systems Engineering* (*HASE*), Available Online at: https://shahrear.github.io/files/papers/iqbal_clickfraud_hase2016.pdf, Jan. 2016, 8 pages.
Kingma et al., "Auto-encoding Variational Bayes", *Machine Learning* (stat. ML); *Machine Learning* (cs.LG), arXiv preprint, arXiv:1312.6114, 2013, 14 pages.
Mcinnes et al., "UMAP: Uniform Manifold Approximation and Projection for Dimension Reduction", arXiv: 1802.03426, Available Online at: https://arxiv.org/pdf/1802.03426.pdf, Sep. 21, 2020, 63 pages.
Safruti, "Bot Attacks Have Become Stealthier and More Dangerous", *Perimeter*, Available Online at: https://www.perimeterx.com/resources/blog/2017/invisible-invaders/, Jun. 19, 2017, 8 pages.
Weng, Attention? Attention! », Available online at https://lilianweng.github.io/lil-log/2018/06/24/attention-attention.html#self-attention, Jun. 24, 2018, 25 pages.

* cited by examiner

TECHNIQUES FOR INPUT CLASSIFICATION AND RESPONSE USING GENERATIVE NEURAL NETWORKS

CROSS-REFERENCE TO RELATED APPLICATIONS

This application is a continuation-in-part of U.S. application Ser. No. 17/492,341, filed on Oct. 1, 2021, which is hereby incorporated by reference in its entirety for all purposes.

TECHNICAL FIELD

The present disclosure relates to methods and systems for detecting invalid web interactions and, more particularly, to techniques for using neural networks to generate an embedding from an input sequence of user interface interaction data, classify the embedding to determine a machine-actor score, and/or authenticate or block web interactions based on the machine-actor score.

BACKGROUND

Invalid interactions with online resources, such as interactions attributable to bots or other automated systems, represent a persistent and significant challenge to maintaining control of data and limiting computational resource expenses associated with serving requests. Invalid interactions may be, or may include, user interface interaction data generated by automated systems configured to emulate valid human users by simulating inputs from peripherals, such as mouse cursor trail data, keystroke data, or voice input data. For example, a bot or other automated scraping system may be configured to repeatedly access a publicly accessible database, such as a social media platform, to generate inauthentic interaction statistics and/or to access and store data. In another example, an automated system "bot" may be configured to map out a social network platform user base of all users in violation of the terms of service of the platform. In some cases, the social media platform may even be tricked when presenting a popup test to ensure that a user is not scraping data from the platform. For example, automated systems are often configured to detect and bypass such tests by simulating a human interaction with the popup to cheat the test.

SUMMARY

In various embodiments, techniques are provided to analyze interaction data and classify said data according to characteristics of the interactions. In various further embodiments, the interaction data is collected from web interactions comprising input sessions and takes the form of, for example, mouse cursor movement and/or click sequence data. The systems and methods described herein involve classification of the interaction data (e.g., as being associated with a human user or a bot) based on a machine-actor score associated with a prediction of interaction validity. The machine-actor score may be indicative of a type and/or classification of interaction as determined by a machine learning system and can be compared to one or more thresholds of permissibility to determine a downstream action to take with respect to the interaction. For example, predicted malicious interactions can be isolated and denied from further interactions with a web-based item. Other entities that are not predicted to be significantly malicious, but are still suspicious may be subjected to lesser responsive action, such as interaction quarantine. Finally, predicted permissible interactions may not be hindered with responsive action.

Invalid interactions are inputs that originate from an automated system (e.g., a robot or "bot") or that is otherwise fraudulent. Invalid interactions cover a range of interaction types including fraudulent automated interactions driven by bot activity, fraudulent interactions driven by real users (non-automated) such as incentivized browsing, and non-fraudulent automated activity such as web crawling. In contrast, valid interactions describes interactions generated by human users performing authorized or otherwise authentic activities and inputs. Some techniques disclosed herein include obtaining cursor-trail data sets including identifications of sequential positions of a cursor to generate an embedding of the cursor-trail data set using a generative machine learning model (e.g. an encoder). The generative machine learning model may be used a part of a technique for distinguishing human interactions from automated, "bot," interactions. It should be understood, however, that the techniques, methods, and systems may be applied to distinguish different classes of interactions of various origins, including invalid human interactions (e.g., "click farming"). As used herein, the terms "interactions" used interchangeably and may refer to "traffic."

Attempts to solve these problems have involved using machine learning models trained using supervised learning and a dataset to detect and analyze invalid input from bots. A machine learning model trained with supervised learning and a training dataset does not require direct manual rule-based refinement and responds more efficiently to adaptations by bots. Machine learning models are therefore better equipped to handle the "arms race" in detecting bots behaviors. However, machine learning model trained with supervised learning and a training dataset can require expensive and intractable labeling of data to learn and operate. Machine learning model trained with supervised learning and a training dataset models cannot efficiently refine and implement a detection model when labels are difficult to generate, or are not available. For example, a machine learning model trained with supervised learning and a training dataset model typically cannot learn to detect, with the required accuracy, input from a relatively new configuration of bot unless training labels exist to train the supervised model, putting bot detectors at a disadvantage when bots have been refined with newly developed techniques and patterns for input.

To address the problem of invalid traffic while removing the resource-intensive requirement for labeled training data, cursor-trail data for analysis is grouped and embedded according to one or more generative machine learning models, such as a generative neural network (e.g., a variational autoencoder comprised of recurrent neural networks or transformer models) that can generate unique input embeddings (compact vectorial representations of the inputs). The resulting embedded input can be analyzed using approaches such as a embedding clusterer subsystem (such as K-means) to cluster the embeddings, and a cluster membership classifier (which may comprise a standard classifier such as logistic regression). A generative machine learning model can process input sequence data (e.g., that identifies the existence, time, duration and/or position of cursor movements, clicks, etc.), generate an unique embedding of the input, classify the embedding via a cluster membership classifier (which has been trained on a clustering of the embeddings learned by the embedding clusterer subsystem), and predict a machine-actor score, which measures the likelihood that the input sequence is from a bot (as opposed to, e.g., a human user).

In the case of rule-based approaches, a system may use a static rule to predict that a user is a bot. For example, when an input cursor speed exceeds a threshold, a bot may evaluate responses from the system to attempt to reverse-engineer the rule(s) and then subsequently modify the bot's interactions (e.g., to slow a speed) to avoid detection. Adapting a supervised detection model typically involves labor-intensive reverse engineering of a bot to capture its characteristic behavior.

In the case of machine learning models trained with supervised learning and a training dataset, the requirement to train a machine learning model using labelled training data is a resource-intensive process. For example, training a machine learning model using supervised learning and a training dataset to detect inputs made by a new bot may require a sophisticated training dataset to be generated and input to the model. Generating a sufficiently representative training dataset of this form on a regular cadence, using human annotations for each training sample, will either be intractable or too noisy, especially if little is known about the bot. As long as the machine learning model trained with supervised learning has not yet been trained to detect inputs from the new bot, the new bot may continue tricking the model. By implementing unsupervised learning models, rather than supervised learning models, the detection system may learn to identify new types of invalid traffic in real-time using substantially fewer resources.

In contrast, techniques disclosed herein that utilize machine learning models trained with unsupervised learning. The trained models may be configured such that the models are trained online or on a frequent cadence with more recent data, thereby making them robust to data drift from an evolving bot ecosystem and corresponding evasion attempts. The machine learning model trained with unsupervised learning and a training dataset may include an autoencoder (e.g., a variational autoencoder comprising recurrent neural networks or transformers) whose encoder is configured to generate embeddings (compact vectorial representations of the inputs), a embedding clusterer subsystem (such as K-means) to cluster the embeddings, and a cluster membership classifier (e.g., logistic regression) which, trained on the clustering learned by the embedding clusterer subsystem, is configured to use an embedding to predict cluster membership likelihoods that may be used to derive a machine-actor score measuring the likelihood that the original input corresponds to a bot. As described herein, an unsupervised machine learning model may be a machine learning mode, such as a generative model, trained using unsupervised machine learning techniques.

With reference to obtaining the raw cursor-trail data for downstream analysis, using a unsupervised machine learning model provides advantages over conventional approaches (e.g., rule-based and supervised learning approaches), including, but not limited to, improved accuracy, robustness, and responsiveness of cursor-trail data groupings by using an embedding of the cursor-trail data generated with a generative machine learning model. Rather than utilizing the raw cursor-trail data collected from an application, or attempting to extract metrics directly from the raw cursor-trail data, the use of the unsupervised generative machine learning model allows for the more efficient grouping and embedding of cursor-trail data relating to an input that will be analyzed. Because the generative machine learning model is unsupervised, it can learn from the latest bot interactions without requiring the generation of a labeled training dataset, as is required by supervised machine learning models.

The generative machine learning model may be an encoder which may have been trained in combination with a decoder—as part of a unified autoencoder model—configured to receive an embedding of cursor data and to generate a predicted reconstruction of the cursor data. The encoder and decoder may have been trained using a loss function that penalizes errors between a reconstruction of the input generated by the decoder and the input that was initially received and processed by the encoder. This training approach promotes generating highly informative and efficient representations of cursor data.

The foregoing, together with other features and embodiments will become more apparent upon referring to the following specification, claims, and accompanying drawings.

DETAILED DESCRIPTION

Figure 1:
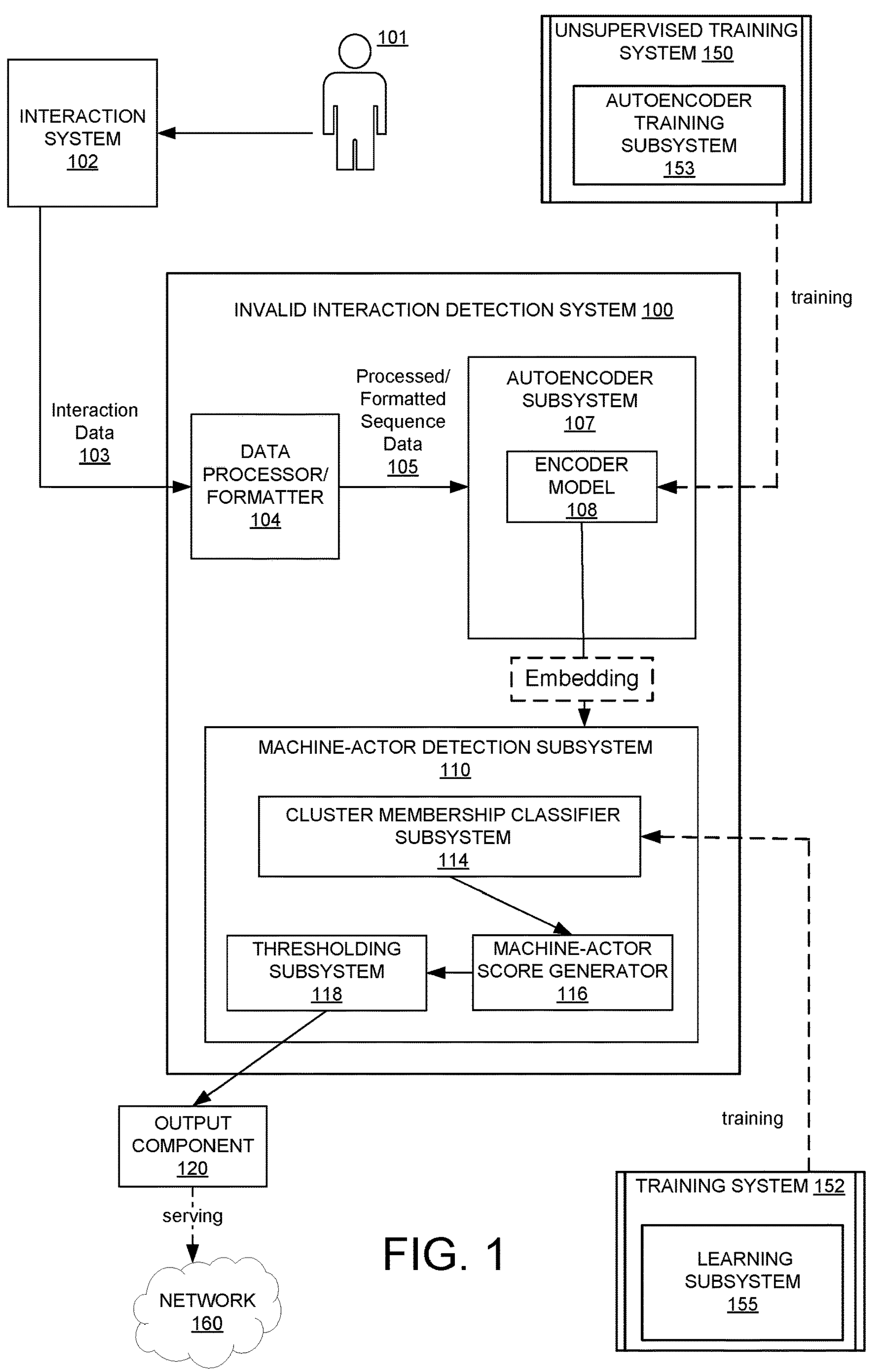
FIG. 1 is a diagram of a bot interaction detection system incorporating a data processor/formatter, an autoencoder subsystem, and a machine-actor detection subsystem, according to certain embodiments described herein.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" or as an "example" is not necessarily to be construed as preferred or advantageous over other embodiments or designs.

A trainable browser interaction processing system is provided that is capable of storing, processing, and/or embedding cursor-trail data sets into embedded representations using generative machine learning model. The resulting embedded representations may be used downstream for validating interaction data. The interaction data may be generated as part of an active application, such as a web browser detecting browser inputs. The trainable interaction embedding, analysis and processing system may be provided in a stand-alone device, as a cloud-accessible service, or the like. In each of these forms, the system is capable of accessing and/or receiving data generated from interactions with a user interface, determining a sequence characterizing sequential interactions using the data, generating an embedding of the sequence using a trained encoder model, classifying the embedding with an appropriate cluster membership classifier (such as logistic regression) which has been trained on a clustering of the embeddings learned by a embedding clusterer subsystem (e.g. K-means), and using the resultant cluster membership probabilities to determine a machine-actor score indicating the likelihood of the input being a bot, determining whether an access-blocking condition is satisfied based on the machine-actor score (e.g., comparing the machine-actor score against a threshold score), and outputting a result indicating whether the access-blocking condition was determined to be satisfied. In some instances, outputting the result includes outputting the result to a web server or to particular code of a web server, such that the web server or particular code can determine how to respond to content requests received from a device associated with the user (e.g., to return requested content when it was determined that the access-blocking condition was not satisfied and to not return requested content when it was determined that the access-blocking condition was satisfied) and/or such that the web server or particular code can push updated web content that lacks particular content when the access-blocking condition was satisfied.

To that end, the techniques, methods, and systems presented herein implement unsupervised learning to overcome the limitations of obtaining comprehensive cursor trail data for analysis. One model system may be an autoencoder, which may be an unsupervised neural network model. The autoencoder may learn a latent representation of the input data called an embedding, which may be a reduced-dimensional version of the input data retaining only its most salient features. Autoencoder models may be trained using unsupervised learning as described by the methods and embodiments presented herein. Unsupervised learning denotes that the model does not use labeled data to guide model training. For example, an unsupervised training framework does not provide class labels indicating specific interaction types (e.g., bot or human) during training, as is done for supervised learning.

Training of an Encoder to Embed the Cursor-Trail Data Sets

An autoencoder may comprise two components: an encoder and a decoder. The encoder may comprise a neural network capable of learning to map the input to an embedding—a compressed latent reduced-dimensional vector representation—in embedding space (a vector space comprising all possible embeddings). Distances in embedding space between embeddings of user inputs are of particular importance, as proximity in embedding space may indicate similarity between the embeddings and hence between the original user inputs. In various embodiments, a set of one or more calculated distances between embeddings may be used by a embedding clusterer subsystem to group similar embeddings together, which then serves as the basis for eventual cluster membership classification and generation of machine-actor scores as discussed below.

The decoder portion of an autoencoder may comprise a neural network capable of learning to reconstruct the uncompressed/non-embedded input from the embedding outputted by the encoder. Different types of neural network models are available to construct the encoder and decoder. The selection of a type of neural network model may depend on the intended application for the model. For example, when processing image data, feedforward neural networks (FNNs) or convolutional neural networks (CNNs) may be selected for use. When processing sequence data, recurrent neural networks (RNNs) or transformers may be selected for use, among other neural network model types. A combination of FNNs, CNNs, and RNNs may be used to encode and decode multi-modal data.

Autoencoders may be trained "end-to-end," where the encoder and decoder are trained jointly. Joint training of the encoder and the decoder may comprise defining a reconstruction error, or "loss", which serves as a loss function for the autoencoder model, where the reconstruction error compares the input and the decoder's reconstruction of the input from the embedding and penalizes the difference (e.g., via a square loss). Training may allow for stochastic gradient descent (or other gradient-based optimization algorithms such as Adam) to be used to optimize the model parameters of both the encoder and decoder. While the decoder plays an important role during training for the formulation of the autoencoder loss function in terms of reconstruction error, it plays no role in inference, at which time the embedding output from the encoder serves as input to a cluster membership classifier, described below.

A variational autoencoder (VAE) is a particular architectural embodiment of an autoencoder model. VAEs are autoencoders that, in addition to the standard autoencoder formulation described above, learn to output embeddings by sampling them from a Gaussian probability distribution whose parameters are learned and outputted by the encoder. As such, the parameters of the sampling Gaussian distribution are learned functions of the input data. Since the embeddings are sampled from a probability distribution, the VAE thus generates nondeterministic outputs of the sequence inputs. The loss formulation for a VAE differs from that of a standard autoencoder in that, in addition to the reconstruction error term described above, VAEs include an additional (additive) term in the loss function which encourages the learned Gaussian distribution over the embedding space to be similar to the "standard" Gaussian distribution with zero mean and unit variance.

A recurrent neural network may include, but is not limited to, gradient recurrent units (GRUs) or long short term memory (LSTM) units. Long short term memory models include at least one long short term memory cell, which can include multiple interacting layers that can keep a piece of information for long or short periods of time during work, and protect the gradient inside the cell from detrimental changes during the training. For example, an LSTM cell may comprise three gates (input, forget, output) and a cell unit. The gates may be configured to use a sigmoid activation, while input and cell states may be transformed with the hyperbolic tangent, or tanh function.

Gradient recurrent unit cells also modulate the flow of information inside the unit and do so without having a separate memory cell. The activation of the GRU cell at time t can include a linear interpolation between the previous activation and the candidate activation where an update gate decides how much the unit updates its activation. This procedure of determining a linear sum based on the existing state and the newly computed state is similar to the LSTM cell procedure. The GRU cell, however, does not have any mechanism to control the degree to which its state is exposed, but exposes the whole state each time. While the preceding description focuses on LSTM and GRU cells, the encoder and decoder components of the autoencoder are not limited to such systems. For example, RNN architectures may be, but are not limited to being, fully-recurrent, bi-directional, recursive, or the like.

Another example of a model that can be used to construct the encoder and decoder of an autoencoder may be a transformer model. A transformer is a deep learning model that can be used to process and model sequential data for a variety of tasks, e.g., machine translation, or modeling mouse cursor trail data for invalid interaction detection. Transformers are typically composed of an encoder and decoder. The transformer's encoder may transform the data into a sequence of intermediate outputs called encodings which it's decoder decodes into an output sequence. The encoder and decoder incorporate multiple encoder and decoder layers, respectively. The output of the encoder contains latent information from the input sequence that permits the decoder to generate the output sequence.

Each encoding layer of the transformer encoder takes sequences of tokens as input, where tokens comprise small, meaningful units of the input. In the context of bot interaction detection, the input sequences could be vector representations of input data, such as mouse cursor position at a particular time, or corresponding to a particular interaction state (describing a condition of one or more states of an interaction peripheral, such as "clicked" or "hovering"). Each encoding layer receives a list of vectorial representations of the input sequences which it passes to a self-attention layer, followed by a feedforward neural network. A self-attention layer attempts to isolate the most salient parts of an input sequence. The output of the feedforward neural network is passed into the subsequent encoder layer, and the output of the final encoding layer of the encoder can represent a final output encoding of the encoder. These encodings are output by the encoder for each token, and hence are token-level encodings, in contrast to sequence-level embeddings which represent a user input sequence in entirety and comprise, by definition, the output of RNN-based encoders. To generate such sequence-level embeddings from a transformer encoder, the token-level encodings must be aggregated, which may, for example, be accomplished by summing or averaging across all token-level encodings to yield a sequence-level embedding. In order for this sequence-level embedding to be a learned function of the input, it must feature in the loss function, which may, e.g., be accomplished by passing it as input to the decoder, concatenating it with the standard decoder input. As in the RNN formulation, transformer decoders are also trained to reconstruct the original input sequences from their inputs.

In order for an autoencoder to process user session data comprising various user-input sequences (mouse cursor movements, clicks, etc.), it is necessary to format, normalize, and otherwise transform the input data first. A specific embodiment of this data pre-processing will now be described for the case when the autoencoder is comprised of RNN encoder and decoders, though it should be noted that other (similar) schemes are possible, and modifications may be necessary when using other models (such as transformer-based autoencoders).

Data pre-processing comprises, firstly, of extracting from historical web interactions comprising user session data only a specific subset of user-input signals, sequential in type, from among many other signals (possibly non-sequential in type), e.g., mouse cursor movement and click sequences. The elements of these movement and click sequences are tuples (x, y, c) of the horizontal (x) and vertical (y) positional coordinates of the mouse on the webpage when the web browser emitted the event, and a timestamp offset c when the event was emitted relative to the start of the user session. These sequences are first ordered by timestamp c and duplicate (or other invalid) events are dropped. The sequences are then converted to sequences of positional and time deltas (dx, dy, dc) by taking the difference of adjacent elements in the original sequences.

Every mouse event type (move, click, etc.) is assumed to be mutually exclusive at a given position (x, y, c). A mouse-state can then be defined as the state of the mouse when a given event was emitted, and the number of possible states is the number of event types being tracked, and additionally "lifted" state, corresponding to large differences in timestamps between successive events, which can be controlled, e.g., with a numerical threshold. With this methodology, the sequences of different modalities (e.g. moves and clicks) are then collated into a unified sequence of vectors where the first three elements of each vector comprise the position and time deltas (dx, dy, dc) of the current event, and the latter elements comprise a one-hot vector specifying the mouse-state. In more detail, all positions of the one-hot portion of the vector have value 0 (inactive) except the position representing the current mouse-state, which has value 1 (active). This vectorial representation facilitates processing by downstream machine learning models, in particular, an autoencoder trained to generate embeddings for each user session input.

Once the data has been cast to the format described above, further processing may include normalization, such as column-wise scaling of the position and time values, and truncating sequences with a uniform length limit to increase efficiency of the autoencoder. In some embodiments, for some or all downstream training stages, we use a stratified sample of the user session inputs based on whether the given session was flagged by other fraud detection methodologies, not based on the method described in this document. Using a stratified sample helps provide the training process with a more suitable distribution of fraudulent and non-fraudulent interactions, whereas an unstratified sample would heavily bias the training data towards non-fraudulent interactions.

Generation of Embedded Representation of the Cursor-Trail Data Sets

Once the encoder—or the generative machine learning model being utilized—has been trained using unsupervised learning as described above, the encoder may be utilized to generate embedded representations of cursor-trail data that will be analyzed in a downstream process for determining a classification of human or non-human interactions. Namely, the trained encoder will receive, as input, formatted/processed cursor-trail data to be embedded. The encoder will use the input formatted/processed cursor-trail data to produce embedded representations that preserve non-fluid, non-human cursor patterns present in the original raw cursor-trail data and corresponding formatted/processed data. It can be important to preserve the non-fluid, non-human cursor patterns present so that a downstream analysis system may classify non-human embeddings appropriately when determining a classification for the cursor-trail data.

Aspects of the cursor-trail data may be represented in the embedded representation of the cursor-trail data generated by the encoder, for example, the identifications of sequential positions of the cursor. Indications of binary input, such as button presses, may also be preserved in the embedded representation. The binary inputs may be included in the embedded representation with corresponding sequence positions of the cursor at the point at which the binary input may have changes (i.e., when the button was pressed or released). The indications/aspects in the embedding can be discerned by processing the clusters of data preserved in the embedding representations.

Analysis of the Embedding of the Cursor-Trail Data Sets

A classifier may be trained to predict a machine-actor score from clustered embeddings. For example, a classifier may be trained to predict a machine-actor score based on the embeddings that are generated by an autoencoder after the embeddings have been clustered according to an embedding clusterer subsystem. The embedding clusterer subsystem may be a sequence of steps for clustering embeddings outputted by the encoder part of the autoencoder and may be separate from the classifier (e.g. the clusterer may be a known clustering algorithm such as K-means or DBSCAN). During training, the embeddings may be clustered by the embedding clusterer subsystem, assigning a cluster label for each embedding. The classifier may then be trained to predict cluster membership by using the training dataset consisting of the embeddings along with the cluster labels learned by the embedding clusterer subsystem. The classifier may use a machine-learning model for generating predicted cluster labels, where the machine-learning model can include, e.g., a probabilistic classification model (such as logistic regression). In other embodiments, the clusterer and classifier may comprise a single model, e.g., as in the case of a mixture model, which learns a multimodal distribution over the input embeddings whose modes can be considered clusters; individual embeddings can be assigned cluster labels by associating them with the mode that most likely generated them.

The classifier may output a probability vector for each input, where each element in the vector is the probability that the input belongs to the corresponding cluster. During inference, the embedding clusterer subsystem may no longer be used: new inputs may be passed through the encoder to create embeddings, and the embeddings may be passed to the classifier which may make cluster membership predictions in the form of probability vectors. Machine-actor scores for inputs may then be computed from the probability vectors, the details of which are described further on. The fact that no clustering may take place during inference holds true in both the embodiment that uses a separate clusterer and classifier as well as in the embodiment which uses a model that combines the clustering and classification functionalities, such as a mixture model. In the latter case we may persist the mixture model during inference but only for its predictive functionality of generating probability vectors for inputs.

As described above, the predictions may be based on a vector of probability values outputted by the cluster membership classifier subsystem including indicating a confidence (or probability) that a particular encoded input corresponds to each of a set of clusters (e.g., a 25% confidence that the encoded input corresponds to a type of user associated with Cluster A; a 40% confidence that the encoded input corresponds to a type of user associated with Cluster B; and a 35% confidence that the encoded input corresponds to a type of user associated with Cluster C). The encoded input may be assigned to whichever cluster is associated with a highest assignment confidence in this embodiment. A machine-actor score can further be generated by first filtering the determined confidences to exclude a confidence associated with a "largest" cluster (to which more encoded input data sets were assigned relative to other clusters or where the variance of the cluster is larger than the other clusters). In other embodiments, we may compute a measure of density of each cluster and exclude the confidences of those clusters whose density measures are below a given threshold (which may itself depend on the clusters, e.g., the average density of the clusters). The machine-actor score can then be (or be generated based at least in part on) the remaining confidences. For example, the machine-actor score may be defined to be a maximum confidence of the remaining confidences.

In various embodiments, a cluster within the overall clustering learned by the clusterer, describes a grouping of similarly patterned inputs. For example, a cluster may describe a grouping of mouse cursor trail embeddings indicating that the original mouse cursor trail inputs exhibit similar patterns. Such a grouping of mouse cursor trails may be analyzed to detect suspicious behavior to aid in a determination of whether an input is invalid. For example, the similarly patterned mouse cursor trails may be analyzed to determine that the mouse cursor trails exhibit rigid, repetitive actions, denoting suspicious input behavior, and should be determined to be an invalid interaction.

In some instances (e.g., instead of using clustering embeddings), a signature can be generated for each of one or more clusters. The signature may include (for example) one or more characteristics of cursor trails represented by embeddings in the cluster. The one or more characteristics may include (for example) a mean or median characteristic across the cluster. In some instances, generating a signature includes identifying a subset of characteristics for which a standard deviation, variance or range of the characteristic across members of the cluster is below a predefined threshold and then defining the signature to represent values for the subset of characteristics. Signatures may be used for a human to understand what type of cursor-trail activity is represented by a cluster. Additionally or alternatively, signatures may be used to facilitate assigning a given cursor-trail data element to a cluster (e.g., by identifying a cluster for which a cluster signature most closely matches an embedding of the cursor-trail data element).

Clustering and classifying embeddings may be achieved by separate embedding clusterer subsystems and classifier algorithms. For example, an invalid interaction detection system may use a separate clusterer (e.g. a system comprising a embedding clusterer subsystem) and classifier to perform the embodiments described herein. The clusterer may be stored, implemented, and utilized in a different system than the classifier, and the only interaction between the entities may be the sending and receiving of the cluster labels assigned to the input embeddings. In various alternative embodiments, the clusterer and classifier may be part of a single model such as a mixture model.

Mixture models are probabilistic models which employ mixture distributions to represent the presence of subpopulations in an overall population. Mixture distributions are probability distributions constructed from combinations of sub-distributions, called components. For example, a mixture distribution may be a linear combination of sub-distributions, where each term in the sum comprises a product between the prior on the component (coefficient) and a posterior probability of the component given the input data. There are different varieties of mixture models depending on the distribution type chosen for the sub-distributions, which may be (but not limited to) Gaussian, Dirichlet, or categorical. Mixture models do not explicitly assign input data to sub-distributions; rather, mixture models allow for the construction of a probability vector whose i-th element is the probability that the input "comes from" the i-th component. In more detail, the posterior probabilities of each component given the input data would be the elements of this probability vector, and a prediction of the most likely component given the input data may be the maximum of the probability vector. In light of this, it may readily be seen how mixture models may simultaneously play the role of clusterer and cluster membership classifier: if components of the overall distribution are interpreted as clusters, the computation of the probability vector just described may be interpreted as cluster membership classification. In this way, a mixture model condenses the role of a embedding clusterer and embedding cluster membership classifier into a single model. As an example embodiment, at training time, a Gaussian mixture model (GMM) would fit the input embeddings with a Gaussian mixture distribution comprised of a combination of individual Gaussian distributions. During inference, the GMM would construct a probability vector for a new input embedding comprised of posterior probabilities of each Gaussian sub-distribution given the input embedding.

FIG. 1 is a diagram of an example bot traffic detection system 100 (also referred to as a "detection system") according to embodiments described herein. Bot traffic detection system 100 utilizes a data processor/formatter 104, an autoencoder subsystem 107, and a machine-actor detection subsystem 110. Machine-actor detection subsystem 110 may contain multiple subsystems therein, including subsystems for model training, and subsystems for inference. A training subsystem 111 may be a subsystem for training model components. The training subsystem may be used separately from other subsystems which perform inference-related operations, such as the inference subsystem. The inference subsystem may be a subsystem for performing inference-related operations, such as generating machine-actor scores/decisions from input sequence embeddings. The bot interaction detection system 100 depicted in FIG. 1 will be recognized as a general "separate model" paradigm where a embedding clusterer subsystem and cluster membership classifier subsystem 114 are separate entities. In various embodiments, cluster membership classifier subsystem 114 may also be part of an inference subsystem as a means of generating cluster membership probability vectors for input sequence embeddings from which individual machine-actor scores may be derived. In various embodiments, a embedding clusterer subsystem and cluster membership classifier subsystem 114 may be realized as a single model/component within the training subsystem (a "single model" paradigm), e.g., as in the embodiment where a mixture model is employed for clustering and cluster membership classification. The detection system 100 is configured to receive, format, and otherwise process user session inputs using a data processor/formatter 104.

The input data may be generated by an entity 101 such as a human or a bot simulating data generated by a data input component at interaction system 102. For example, entity 101 may input interactions into a user web interaction system such as interaction system 102. Interaction data generated by the interaction system 102 may then be forwarded to data processor/formatter 104 as interaction data 103 by recording mouse cursor data from interactions made by entity 101 and combine the interactions with mouse state data for interacting with a browser or console environment. State data may include the specification of different types of mutually exclusive interaction states, such as "click," "unclick," "moving," "hovering," etc., which occur in real-time. Data preparation may further comprise cleaning and de-densification, for example, by ordering the interaction data 103 according to timestamps and removing duplicate events. In various embodiments, the interaction data 103 is then forwarded to data processor/formatting 104 within invalid interaction detection system 100. Data processor/formatter 104 may parse the input data 103 and process/format the interaction data 103 into a different state usable by other subsystems, such as autoencoder subsystem 107. The resulting processed/formatted sequence data 105 may then be sent to the autoencoder system 107, which may recognize the format of the processed/formatted data sequence data 105 and utilize it according to the embodiments described herein. In various embodiments, data processor/formatter 104 is configured to receive data prepared by associated systems, such as a data aggregation system, where the detection system 100 is used as part of a security system.

In some embodiments, the input data includes historical interaction data collected from interactions over a previous and/or present period of time. For example, interaction data may be collected over a period of time and stored in a data repository. The interaction data may be collected over the period of time and sent, from the repository, to another system, as historical interaction data. For example, instead of capturing and forwarding interaction data in real-time, the interaction data may be captured in real-time and collected in a repository. At a later time, all collected interaction data may be released in a newly collected data set comprising the historical interaction data.

The invalid interaction detection system, or "detection system," 100, may perform or cause one or more actions to be performed using the interaction data 103, for instance, by using the data processor/formatter 104, the autoencoder subsystem 107, or the machine-actor detection subsystem 110, a cluster membership classifier subsystem 114, a machine-actor score generator 116, and a thresholding subsystem 118. Each of these subsystems is a component of machine-actor detection subsystem 110. The cluster membership classifier subsystem 114 may also be part of a training system due to the manner in which it is trained on the cluster labels to make cluster membership predictions in the inference stage. In this way, the detection system 100 may process interaction data 103 using the machine-actor detection subsystem 110, and may output an interaction determination and an interaction authorization, such as by way of an output component 120. For example, the output component 120 can be, or include, a virtual network interface card or a physical router device that can output data to a network 160, for example, to associated bot interaction detection systems or interaction control systems.

In various embodiments, the detection system 100 may be further configured to forward requests indicated by the interaction data 103 for human interaction and to block requests for bot interactions. Furthermore, the output component 120 may be communicatively coupled to one or more display devices so as to permit the presentation of visualizations of output of one or more subsystems of the detection system 100 on a display screen of the display device. For example, reduced dimension projections of classifier output (e.g., cluster plots) may be presented visually to a user, and comparison of the output of bot interaction detection using alternative modalities as a verification technique may be displayed as well.

In various embodiments, the detection system 100 is a specialized computing system that may be used for processing large amounts of data by using a large volume of computer processing cycles relative to normal operation. The numbers of devices depicted in FIG. 1 are provided for illustrative purposes. Different numbers of devices may be used. For example, while each device, server, and system in FIG. 1 is shown as a single device, multiple devices may be used instead to facilitate the operation of any entity presented therein.

In various embodiments, the processing performed by the detection system 100 is implemented by a pipeline of components or subsystems, including a data processor/formatter 104, an autoencoder subsystem 107, and a machine-actor detection subsystem 110, and may involve an output component 120. The subsystems listed above may be implemented in software (e.g., using code, a program, or instructions executable by one or more processors or cores), in hardware, or in a combination of hardware and software. In certain implementations, a plurality of subsystems described herein may be combined into a single subsystem. Additionally or alternatively, in some implementations, the functions described herein as performed by a particular subsystem may be implemented by multiple separate subsystems.

The data processor/formatter 104 includes hardware and software configured to receive interaction data 103. In some instances, the data processor/formatter 104 may be part of the detection system 100. In some other instances, the data processor/formatter 104 may be separate from and be communicatively coupled with the detection system 100. The processor/formatter 104 may, for example, include data input hardware and software communicatively coupled to a data receiving/processing/formatting/transforming system. In an illustrative example, the processor/formatter 104 may include an application programming interface (API) in communication with a sessionizer system or other subsystems, configured to interface with computer systems over a network. In another illustrative example, the processor/formatter 104 may include a personal computer configured to receive a set of interaction data 103 for processing by the subsystems of the detection system 100.

The interaction data 103 and is parsed by data processor/formatter 104 to generate an input sequence of processed/formatted sequence data 105 that may be sent to autoencoder subsystem 107, and is associated with a distinct user session. The input sequence may include, but is not limited to, a finite-length vector of mouse cursor position data and interaction state data for the single session. To define a session, a start event and an end event may be recorded or identifier for the session, such that the input sequence may be bounded before being stored and/or sent to subsequent subsystems of the detection system 100. The input sequence may be collated into input sequences from content interactions based on distinct user sessions, which may be associated with the presentation of content on a user device (e.g., a tablet or a display). The sessions may be further divided into time periods over which the interactions occur, and the input sequences may be grouped into these time periods to form bounded time sequences of input data. In an illustrative example, a distinct session may correspond to a period of time during which a web page is loaded and presented on a display, during which time mouse cursor event data may be collected.

Upon generating the input sequence of processed/formatted sequence data 105, the autoencoder subsystem 107 is configured to access or receive the input sequence. For example, the input sequence may be received from a data storage utility in communication with the detection system 100 to generate an output embedding. The output embedding may be an embedded version of the cursor-trail data of the input sequence. For example, the embedding may be a low-dimensional representations of the input cursor-trail. In some examples, the embedded representation is a fixed-length multi-dimensional vector expressing one or more latent dimensions of the sequential positions of the cursor. The fixed-length multi-dimensional vector expresses one or more latent dimensions, as described in more detail in reference to FIG. 4. As part of its processing, the autoencoder subsystem 107 uses the encoder model 108 to generate the output embedding.

In various embodiments, an autoencoder system employs a variational autoencoder (VAE) architecture to learn output embeddings by sampling them from a Gaussian probability distribution whose parameters are output by the encoder. The autoencoder subsystem 107 may be trained using historical interaction data. For example, a dataset may be accessed by the detection system 100, either provided as part of interaction data 103, processed/formatted sequence data 105, or via a database in communication with the detection system 100, where the dataset includes historical interaction data for human interactions and bot interactions. The interaction data may include data that has already been classified by detection systems employing alternative modalities. In this way, the training data may be stratified to address bias introduced in training by a relatively low frequency of bot interaction requests that may occur in typical interaction patterns. Training the models of the autoencoder subsystem 107 is described in detail in reference to FIG. 2.

Figure 3:
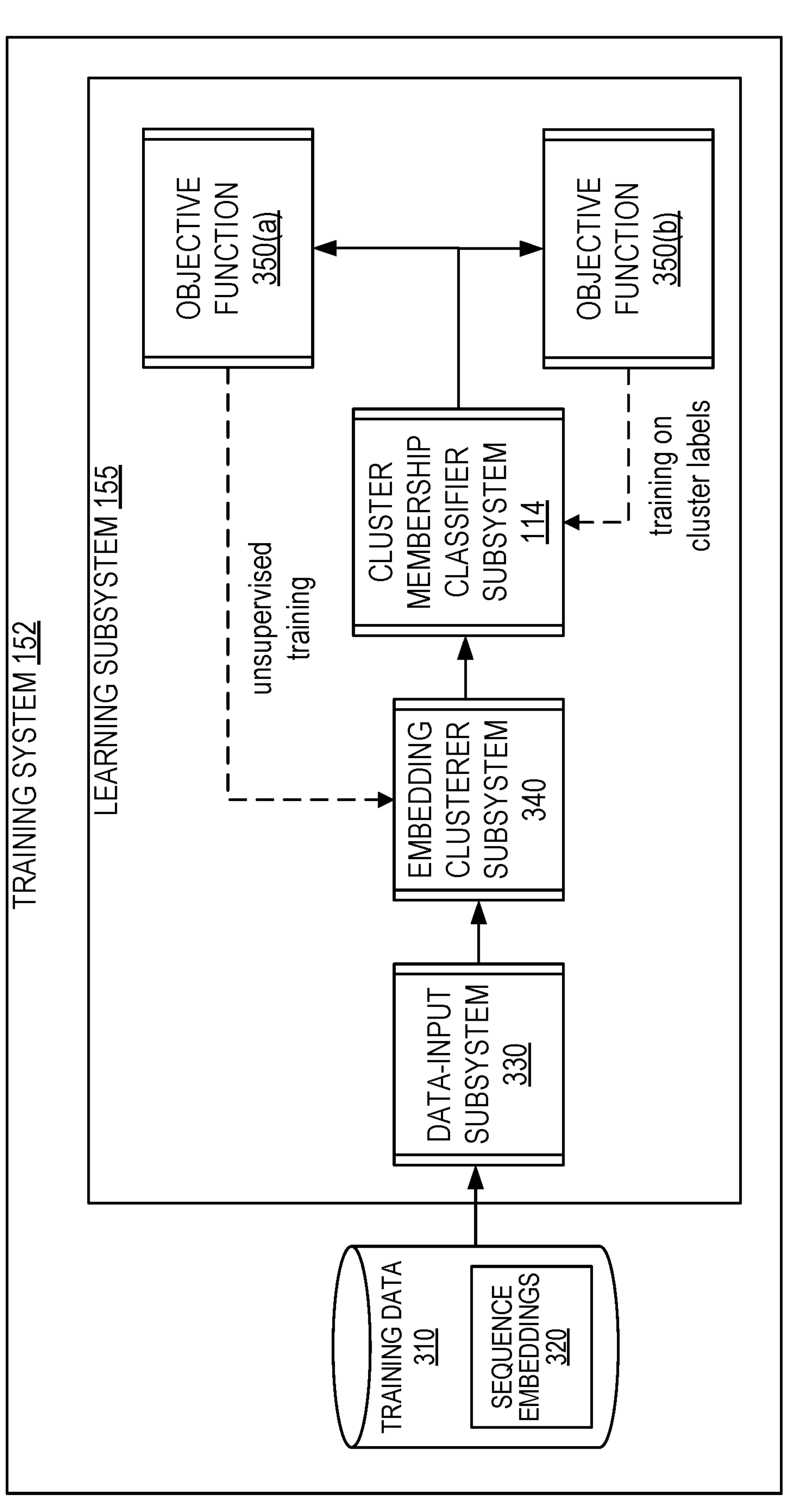
FIG. 3 is a diagram of a training system for the embedding clusterer subsystem and cluster membership classifier—both components of the machine-actor detection subsystem—according to certain embodiments described herein.

In various embodiments, interaction classification is performed by the machine-actor detection subsystem 110. The machine-actor detection subsystem 110 accesses or receives output embeddings generated by the autoencoder subsystem 107. The embeddings received by the machine-actor detection subsystem 110 may include fixed-length vectors of multidimensional encoder output. To that end, in various embodiments, the machine-actor detection subsystem 110 may include the entities 114-118 depicted in FIG. 1. Machine-actor detection subsystem 110 may comprise cluster membership classifier subsystem 114. The cluster membership classifier subsystem 114 may access the data received by the machine-actor detection subsystem 110, such as the output embedding generated by the encoder model 108, and implement a classifier to predict a vector of probability values corresponding to a number of clusters determined using a system such as embedding clusterer subsystem 340 as shown in FIG. 3. For example, the cluster membership classifier subsystem 114 may be trained, to predict a cluster membership, which will be accorded to the embedding. The cluster membership may correspond to groupings of similar mouse cursor trail patterns known or learned by a model. For example, a cluster membership may be accorded to a group of embeddings generated from input patterns, the embeddings grouped in the cluster membership having some degree of similar qualities, such as shape, distribution, probability, vector, or any other applicable feature. The cluster membership classifier subsystem 114 may therefore be trained to predict a cluster membership which should be accorded to a received embedding.

Machine-actor detection subsystem 110 may further comprise machine-actor score generator 116. Machine-actor score generator 116 may be an entity which uses a prediction formed by cluster membership classifier subsystem 114 to quantify a score related to a level of suspiciousness of an embedding received by machine-actor detection subsystem 110. For example, machine-actor score generator 116 may compute and output as the machine-actor score the highest probability value from the probability values output by the cluster membership classifier subsystem 114 excluding the value corresponding to a “largest” cluster found by an embedding clusterer subsystem. Machine-actor detection subsystem 110 may further comprise thresholding subsystem 118. Thresholding subsystem 118 may be a system or entity which stores and applies thresholds to generated machine-actor scores, such as those generated by machine-actor score generator 116. In various embodiments, thresholding subsystem 118 may generate a determination as to whether an embedding received by machine-actor detection subsystem 110 may be categorized as a valid or invalid input based on one or more specified threshold values.

As shown in FIG. 1, in various embodiments, the unsupervised training system 150 trains the encoder model 108. For example, the encoder model 108 may be or include a recurrent neural network or a transformer model. The unsupervised training system 150 may access and/or receive one or more sets of training data, and may train the encoder model 108 concurrently with a decoder model which learns to reconstruct the input sequence from the output embedding. When trained as part of an autoencoder framework, an autoencoder loss function takes the form of a reconstruction error, which penalizes the difference between the input sequence and the decoder reconstruction of the input sequence.

In various embodiments, additional processes may cause training of the cluster membership classifier subsystem 114 to reduce bias and balance classification techniques. In addition to training the cluster membership classifier subsystem 114 using training, the training system 152 may further refine the cluster membership classifier subsystem 114 for its operation in the detection system 100 using these additional processes, such as stratification. Training data for both the autoencoder subsystem 107 and the cluster membership classifier subsystem 114 may be drawn from a stratified sample of impressions based on whether the given input was flagged as a bot interaction by other detection techniques, possibly based on other modalities. Using a stratified sample improves the training process by providing a distribution of fraudulent and non-fraudulent interactions that reduces bias towards valid input. Bias in this sense may result in the classifier predicting false negatives in the classification stage. In this way, training data may be balanced between valid and invalid interactions. This stratification process may provide the advantages above when used in supplement to the main training methods described herein.

In various embodiments, models that are trained according to the methods described herein may be retrained to improve detection of valid and invalid inputs. As one example, retraining of the autoencoder may allow for improved embedding generation which captures more salient features of an input sequence. In another example, retraining of the embedding clusterer subsystem may allow for an improved clustering of input embeddings by picking up on more granular embedding qualities. In yet another example, retraining a cluster membership classifier, as described in reference to FIGS. 3-4, may allow for improved cluster membership classification by more accurately predicting a classification for a clustered embedding using additional criteria or nuanced features of the clustered embedding.

This retraining may improve the performance of the various components, including thresholding subsystem 118 by facilitating retraining and dynamic adjustment of learned model parameters of the autoencoder subsystem 107 and the cluster membership classifier subsystem 114. Such retraining may improve the robustness of the classifier in an "arms race" between bot interaction systems and the detection system 100. For example, the autoencoder subsystem 107 and the cluster membership cluster membership classifier subsystem 114 may be retrained on a regular basis, by updating training data with new input sequences. In this way, adaptation by bots or other sources of invalid interaction access attempts will be learned by the cluster membership classifier subsystem 114.

As described above, the various subsystems of the detection system 100, working in cooperation, provide the functionality that enables the detection system 100 to receive interaction data 103 and to determine whether the interaction data 103 represents human interactions or bot interactions. The various subsystems described above may be implemented using a single computer system or using multiple computer systems working cooperatively. For example, for a device implementing the detection system 100, the subsystems of the detection system 100 described above may be implemented entirely on the device with which the user interacts. In some other implementations, some components or subsystems of the detection system 100 may be implemented on the device with which the user interacts, while other components may be implemented remotely from the device, possibly on some other computing devices, platforms, or servers.

Figure 2:
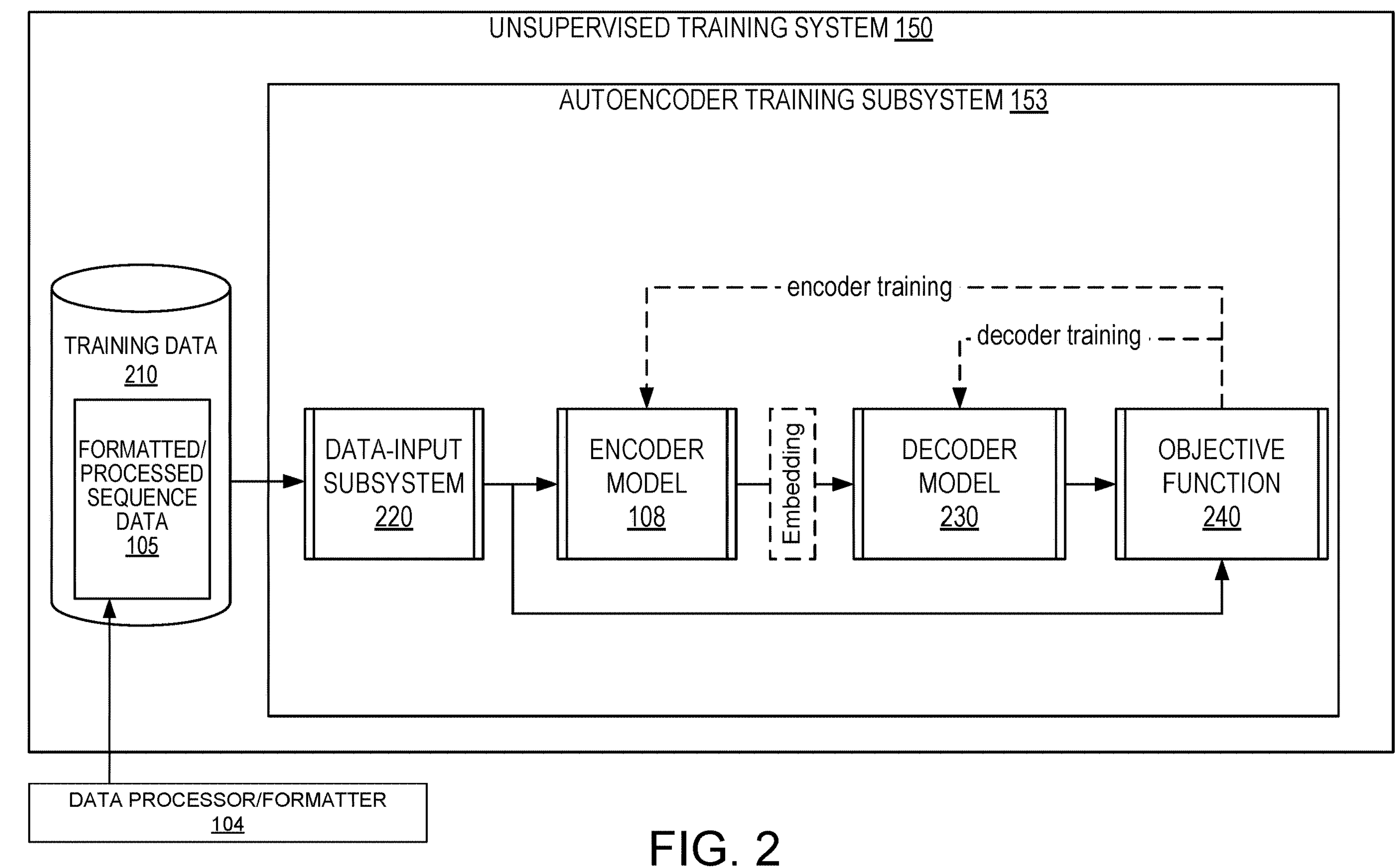
FIG. 2 is a diagram of a training system configured for unsupervised training of the autoencoder of the bot traffic detection system, according to certain embodiments described herein.

FIG. 2 is a diagram of an unsupervised training system 150 configured for unsupervised training of the autoencoder subsystem 107 of the bot interaction detection system 100 through the use of an autoencoder training subsystem 153, according to certain embodiments described herein. As described above, the autoencoder subsystem may also implement transformer models. Training data 210, accessed and/or received by the autoencoder training subsystem 153 may be or include historic data from human interaction or bot interaction sources, processed to prepare formatted/processed sequence data 105. The formatted/processed sequence data 105 may be received from data processor/formatter 104 as described herein. In various embodiments, the training data 210 may be or include synthetic data, in addition to or instead of historical data.

Generating synthetic data, for example, by a generative neural network model, may improve the accuracy and speed of the autoencoder training subsystem 153, in cases where large volumes of processed/formatted sequence data 105 are used to train the encoder model 108. Furthermore, training data 210 may be stratified so as to provide a dataset balanced between bot and human interactions, as an approach to training the encoder 108 where bot interactions may be underrepresented in the input data. In various embodiments, the autoencoder training subsystem 153 includes a data-input subsystem 220, which may be or include one or more devices and/or virtual devices configured to access and/or receive the processed/formatted sequence data 105 from the training data 210 source and provide the data to one or more constituent subsystems of the unsupervised training system 150.

In various embodiments, the unsupervised training system 150 is implemented as a computing device or portion thereof, such as a server. The unsupervised training system 150 may be implemented as a specialized hardware device or as program code, or a combination of both. For instance, the operations described herein as being performed by the unsupervised training system 150 may be embodied in program code implementing the unsupervised training system 150, where such program code is executable by one or more processing units. For instance, the data-input subsystem 220, the encoder model 108, and a decoder model 230, the objective function 240, and other aspects of the autoencoder training subsystem 153 may each be implemented as one or more software functions or specialized hardware devices and may operate together to implement the unsupervised training system 150 as described herein. The encoder model 108 and the decoder model 230 may each be implemented as separate machine learning models, such as recurrent neural networks. The unsupervised training system 150 may implement separate unsupervised training algorithms for training the respective subsystems of the invalid interaction detection system 100, such that each subsystem is trained using unlabeled data. As such, the cluster membership classifier subsystem 114 may be trained to generate machine-actor scores for input embeddings using labels predicted by an embedding clusterer subsystem, where an embedding clusterer subsystem, such as embedding clusterer subsystem 340, may be trained using unlabeled training data.

The encoder model 108 may be agnostic to the origin of the formatted/processed sequence data 105. As such, the encoder model 108 may be trained to generate embeddings from input sequences that may correspond to human or bot interactions. The decoder model 230 may be configured to take as input the output embedding of the encoder model 108, and generate an output sequence, provided to the objective function 240. The objective function 240 may, in turn, access and/or receive the output sequence from the decoder model 230 and the input sequence from the data-input subsystem 220. Through a comparison of the output sequence and the input sequence, the objective function 240, which may, for example be realized as a square loss, adjusts one or more learned parameters of the encoder model 108 and/or the decoder model 230. As such, the encoder model 108 and the decoder model 230 may be trained jointly as part of a unified autoencoder training process.

In various embodiments, the autoencoder training subsystem 153 processes formatted/processed sequence data 105 until it minimizes an objective function 240, for example, defining change in the comparison between the output sequence and the input sequence and/or estimating the marginal change in learned parameters with each training cycle. In this way, the autoencoder training subsystem 153 may verify that the output embedding of the encoder model 108 preserves salient information of the input sequence, while providing a fixed-length vector to the classifier that can be effectively clustered and classified. In this context, "salient" information may refer to a reduced-dimensional representation of the input sequence that may serve as an input to a clustering model. After training, the encoder model 108 may be used as part of a bot interactions detection system, such as that shown in FIG. 1.

FIG. 3 is a diagram of a training system 152 for training of embedding clusterer subsystem 340 and cluster membership classifier subsystem 114 of the machine-actor detection subsystem 110, according to certain embodiments described herein. As described above, embedding clusterer subsystem 340 may be a standard clusterer such as K-means, which learns a clustering of the sequence embeddings 320, that is, it assigns a cluster label to each input embedding. Because proximity in embedding space may imply similarity, each cluster in the learned clustering may correspond to a grouping of inputs featuring similar characteristics, and by extension, such groupings may correspond to invalid interaction patterns. As described above, the cluster membership classifier subsystem 114 may be, or may comprise, a standard classifier, such as a logistic regression model. Given cluster labels assigned to input sequence embeddings 320 by embedding clusterer subsystem 340, classifier 114 may be trained to predict, for a given embedding, the probability of it belonging to each cluster found by embedding clusterer subsystem 340. As such, training system 152 may include applying a learning technique using one or more prepared sets of training data 310 which are transformed into sequence embeddings 320 by the autoencoder subsystem 107. The training data 310 may be or include the same training data used for unsupervised training of the autoencoder subsystem 107.

Sequence embeddings data 320 may be data corresponding to embeddings of valid and invalid interaction data which is used to train the autoencoder subsystem 107. Where the classifier is trained by the training approaches described above, the cluster membership classifier subsystem 114 is not provided with labeled embeddings. In various embodiments, the training data 310 includes a population of input embeddings that has been generated using input sequence data for each of a number of subpopulations representative of different types of invalid interactions (e.g., bot interactions) and authentic human interactions that the cluster membership classifier subsystem 114 is to learn. In various further embodiments, the classification is a binary classification representing whether the interaction is, or is not, a bot interaction. As with training the encoder model 108, the cluster membership classifier subsystem 114 may be trained using a stratified dataset including a balanced proportion of sequence embeddings 320, as an approach to limiting bias of the classifier to classify input sequences in an unbiased manner. The training data 310 may be run through a data-input subsystem 330. In various embodiments, data-input subsystem 330 may perform processes that are similar to data-input subsystem 220 described above.

Learning subsystem 155 may implement one or more objective functions. Learning subsystem 155 may comprise an objective function 350(*a*) suitable for learning settings, or more specifically, for clustering (of embeddings outputted by encoder model 108). For example, if embedding clusterer subsystem 340 was realized as a K-means clusterer, objective function 350(*a*) may employ an objective function which penalizes intra-cluster distance to the cluster centroid, summed over all clusters. Training using the objective function 350(*a*) may include adjusting one or more weights and/or coefficients of the embedding clusterer subsystem over multiple iterations until the value of the objective function 350(*a*) converges to a local or global minimum. For example, parameters defining each cluster in the embedding clusterer subsystem, such as a central position and a distribution, may be adjusted with each training iteration, and an objective function 350(*a*) may be evaluated using the current values for each cluster.

The values of an objective function 350(*b*) suitable for supervised learning settings may be utilized to adjust one or more parameters of cluster membership classifier subsystem 114 with each training iteration to better recognize classifiable elements of a clustered embedding (outputted by encoder model 108) and predict cluster membership for the embedding. Objective function 350(*b*) may be different than objective function 350(*a*) in that objective function 350(*b*) may be suitable for supervised learning settings, e.g., to train cluster membership classifier subsystem 114 to predict embedding cluster membership using the predictions of embedding clusterer subsystem 340 as labels. If, e.g., cluster membership classifier subsystem 114 were realized as a logistic regression model, objective function 350(*b*) may comprise a cross-entropy loss function, used for training cluster membership classifier subsystem 114.

In various embodiments using, e.g., a mixture model (such as a Gaussian mixture model), objective functions 350(*a*) and 304(*b*) may collapse to a single objective function 340 used to train a consolidated system, i.e., where embedding clusterer subsystem 340 and cluster membership classifier subsystem 114 collapse to a single component comprising the mixture model. To elaborate, e.g., a Gaussian mixture model (GMM) may fit a multi-modal Gaussian distribution to the input embeddings (the individual Gaussian distributions play the role of clusters) from which "cluster labels" can be inferred as the label of the individual distribution with highest posterior probability given the input (this covers the role of classification). The objective function in this latter example may be derived from the expectation-maximization algorithm which may be used to train the GMM.

General, parametric learning models may be trained and tested using a range of variable configurations and/or hyperparameters to determine a best configuration for a particular application of the model. The autoencoder training subsystem 153 and the learning subsystem 155 may implement distinct hyperparameter tuning algorithms to optimize, in the case of the former, the autoencoder subsystem 107, and in the case of the latter, the embedding clusterer subsystem 340 and the cluster membership classifier subsystem 114. For example, one or more terms of the objective function 340 and/or the cluster membership classifier subsystem 114 and/or the embedding clusterer subsystem 340 may be tuned by varying parameters that are not learned, such as scalar weighting factors. Because the embedding clusterer subsystem 340 and cluster membership classifier subsystem 114 are separate entities, the various components of each may be individually optimized at a finer level of granularity than the situation where clustering and classification is combined in one model, such as a mixture model.

Figure 4:
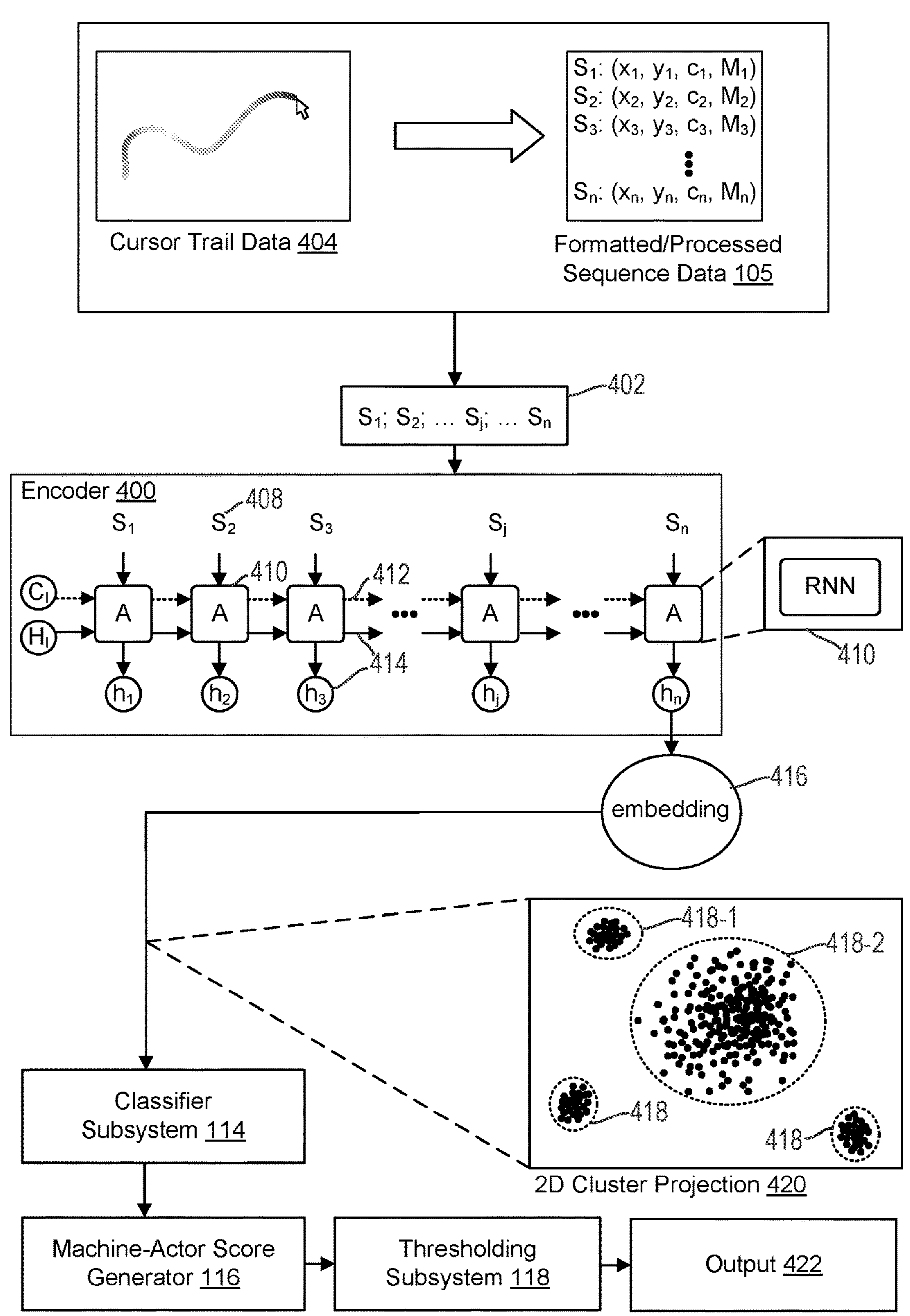
FIG. 4 is a schematic diagram of a method of the inference stage of detecting bot traffic from mouse cursor trail data, according to certain embodiments described herein.

FIG. 4 is a schematic diagram of the inference stage of detecting bot interactions from mouse cursor event data, according to certain embodiments described herein. As an illustrative example of the techniques described in reference to FIGS. 1-3, FIG. 4 describes an encoder 400 receiving, as an input sequence 402, mouse cursor event data (comprised of, e.g., both movement and click sequences) as part of an inference process for determining some output according to the embodiments described herein. The encoder 400 may be part of an autoencoder comprising RNN encoders and decoders as discussed herein.

While other user interface interaction data could be similarly treated, the mouse cursor event data 404 is illustrated in FIG. 4, as an example that includes position changes according to a series of position deltas. The position deltas may be constructed from specific subsets of user-input signals, sequential in type, extracted from historical web interactions comprising user session data. In various embodiments, deltas between positions in a coordinate system (e.g., "x," "y," "r," "θ," etc.) may be accompanied by corresponding deltas between timestamps (e.g., "t," or "c"). State values ("M") may be used to further denote a current state of input received. For example, a state value M may comprise a vector representing the state of input, such as when a mouse button is pressed, unpressed, clicked, release, etc. In constructing the sequence of deltas, the rule that only a single mouse cursor event may occur at a given position and time may be enforced (e.g. arbitrarily or favoring a privileged event type such as movement) whence the state M may be represented as a one-hot vector which takes the value 1 in the coordinate representing the active event type and 0 in all other coordinates. Using these methods thus allows the sequences of different modalities (e.g., mouse movements, clicks) of the input to be collated into a unified sequence of vectors comprised of deltas and states.

It is important that the embeddings generated by the generative machine learning model preserve non-fluid, non-human cursor patterns present in the original raw cursor-trail data. The non-fluid, non-human cursor patterns are typically indicative of invalid bot-based interactions with an application. For example, humans often interact with input devices using fluid, imprecise, and non-periodic input. In contrast, bots often generate input using non-fluid, non-human, precise and/or periodic input (i.e., input that changes corresponding to fixed time intervals, such as steps of a script operated by a bot). In some cases, a bot may utilize functions that attempt to simulate fluid, random movement of a human. These bot interactions will nonetheless contain some patterns which would not be perfectly indicative of a human interaction. Thus, proper, thorough, and continuous training of the generative models discussed herein is an important feature in detecting inputs from these simulating bots.

As described herein, an input device, such as a mouse, tablet, or other electronic input device, may be used to generate the input interaction data. Concurrent with the use of the electronic input device, a cursor may be displayed on a graphical user interface representing a relative position of input at the electronic input device. As the electronic input device is manipulated to generation interaction data, the cursor displayed on the graphical user interface will also change its position or state accordingly. This may be used to facilitate interaction with an application utilizing the graphical user interface. For example, the electronic input device may interact with one or more additional element on the graphical user interface implemented as part of the application by aligning the cursor with the additional elements on the graphical user interface and causing some interaction therewith.

For each entry in the input sequence 402, the position of the mouse cursor may be defined as a difference between the current location and the preceding position (e.g., in Cartesian coordinates or polar coordinates). The input sequence 402 may be generated based on the formatted/processed sequence data 105 that is derived from the cursor trail data 404. In this way, the input sequence may include a tuple of position data and velocity data in a single set of coordinates, through the inclusion of a differential time value "c" that describes the time elapsed between the current data point and the preceding data point. The state values "M," may be or include a one-hot vector of defined states.

For the input sequence 402 to the encoder 400, each time point can be provided as an input state 408 to cell 410 of the encoder 400, which may include an arbitrary number of cells 410 corresponding to the variable length of the input sequence 402. As described previously, the encoder 400 may be an implementation of an RNN, for which the cells 410 may include LSTM cells or GRU cells, among other approaches to context-sensitive sequence embedding.

Each cell 410 receives an input state 408, a cell state 412, and a hidden state 414 from a preceding cell 410 in the neural network. For the first cell of the cells 410, corresponding to a first time step in terms of memory, an initial cell state and initial hidden state are provided to the first cell. LSTM cells and GRU cells differ in that GRU cells do not pass a cell state 412. The hidden state 414 passed to the subsequent cell 410 facilitates information retention and provides the capability for the encoder 400 to identify latent information permitting bot interaction detection, for example, movement in the cursor position or changes in the state of the interaction. In various embodiments, the final hidden state 414 of the encoder 400, "$h_n$," serves as the embedding 416 that can be taken in by the cluster membership classifier subsystem 114. The final hidden state may be selected to include latent information from the entire input sequence 402 and to reduce the likelihood that an entry is omitted that could affect the classification. That being said, intermediate hidden states 414 may serve as the embedding 416, for example, where classification of the input sequence 402 would be improved. For example, when a bi-directional encoder is used, an intermediate hidden state 414 may better represent latent dimension information than either terminal hidden state 414.

The resulting embedded data may then be sent to cluster membership classifier subsystem 114 to predict a probability distribution for each of a number of clusters 418 using unlabeled input sequences. As described above, in various embodiments, the encoder 400 is included as part of an autoencoder system (e.g., autoencoder subsystem 107). In some cases, the clusterer and/or classifier may output a visualization of the clustered data, for example, as a three-dimensional cluster projection or a two-dimensional cluster projection. A two-dimensional (2D) cluster projection 420 may represent clustering of data for each of the clusters 418 on a pair of axes selected to illustrate the separation between clustered embeddings.

As illustrated, different clusters 418 may have different positions in the 2D coordinate system and different distribution densities. In some cases, bot interactions and human interactions may be distinguishable by distribution density, where aspects of the input sequences generated by the bot algorithm may include a high degree of replication or exhibit other detectable patterns; in this case, clustering may produce high-density groupings of the inputs which display similar repetitive patterns, and low-density groupings otherwise. For example, in some input datasets, a largest, low-density cluster (in terms of the number of points) is more likely to be attributable to a mixture of authentic, non-repetitive human interactions and bot interactions indistinguishable from the human interactions, while other smaller low-density clusters may comprise similarly-patterned inputs which are likely bot interactions. To illustrate, a cluster 418-2 may be characterized by low cluster density and higher population size than cluster 418-1. The output of the classifier may be or include a probability distribution describing the likelihood that the input sequence 402 is attributable to each of these clusters among others. For example, in the example of the 2D cluster projection 420, the output of the classifier includes a four-element vector of values between zero and one, describing the probability that the input sequence 402 is attributable to cluster 418-2 displaying relatively variable behavior, or to a cluster displaying repetitive behavior (e.g., cluster 418-1).

During inference, the output of the classifier may be processed by machine-actor score generator 116. Machine-actor score generator may generate a machine-actor score based on the classified clusters 418. In various embodiments, machine-actor score generator 116 may modify the output vector by removing the probability value attributed to the largest cluster. Subsequently, the remaining probability values, such as the highest probability value, may be used to determine the machine-actor score. In an illustrative example, the classifier output may be a four-element vector $P=[p_1, p_2, p_3, p_4]=[0.01, 0.002, 0.89, 0.098]$, which would indicate that the input sequence 402 is attributable to class 3 with high likelihood.

As an illustration, but not generally, where class i=1 corresponds to the largest cluster, the machine-actor score generator 116 may remove the first element from vector P, leaving P=[0.002, 0.89, 0.098]. From the largest probability value, $p_3=0.89$, a machine-actor score may be predicted. In the simplest example, a machine-actor score may simply be $p_3$, such that the probability that the input sequence 402 corresponds to bot interactions exceeds 89%. Machine-actor score generator 116 may then send the machine-actor score to thresholding subsystem 118. Thresholding subsystem 118 may use a threshold value or metric to determine whether the generated machine-actor score meets, exceeds, or does not exceed a threshold value. This determination may be sent to output 422.

Figure 5:
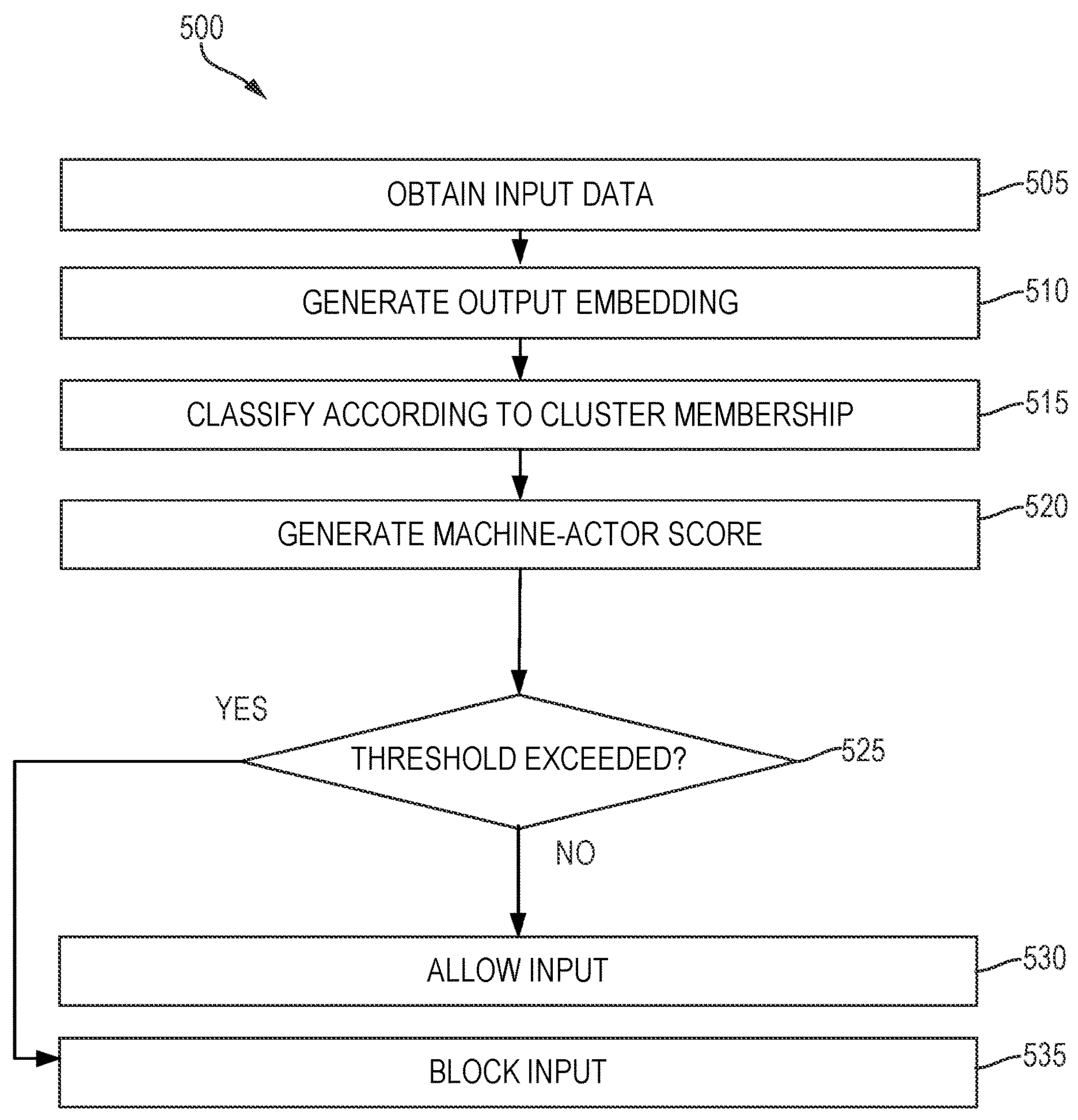
FIG. 5 is a block flow diagram of a method 500 of the inference stage of detecting bot traffic from mouse cursor trail data, according to certain embodiments described herein.

Output 422, which may include operations of the output component 120 described in reference to FIG. 1 and FIG. 5, may include providing a verification that the input sequence corresponds to an authentic interaction with a human user. By contrast, where the input sequence is deemed suspicious (i.e. indicative of invalid traffic), output 422 may include an instruction and/or message to associated systems to flag the corresponding request and/or the source of the request. Outputting may also include, but is not limited to, generating and/or presenting a visualization of the 2D cluster projection 420, such as on a display of a user device, or communicating the probability values, the input sequence, and/or the embedding to an associated security system for use in further bot interaction detection processes.

FIG. 5 is a block flow diagram of a method 500 of the inference stage of detecting bot interactions from mouse cursor trail data, according to certain embodiments described herein. Specifically, the detection system 100 may perform this method 500 or similar where the cluster membership classifier subsystem 114 has been trained to classify the cluster membership of embeddings generated by the encoder 108 from input data 105, and predicated on the clustering learned by embedding clusterer subsystem during training. Thus, this method 500 or similar may be performed to distinguish bot interactions from human interactions and to serve a gatekeeping function by blocking or forwarding requests based on the classification of the input data 105.

The method 500 depicted in FIG. 5, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 500 is intended to be illustrative and non-limiting. Although FIG. 5 depicts various activities occurring in a particular sequence or order, this is not intended to be limiting. In certain embodiments, for instance, the activities may be performed in a different order, or one or more activities of the method 500 may be performed in parallel. In certain embodiments, the method 500 may be performed by the detection system 100.

At block 505, the detection system 100 obtains input data 105, which may be or include mouse cursor trail data generated as part of an interaction with a user interface element, such as a button. In various embodiments, the data is collected from historical web interactions. For example, the data may be collected from a user web session comprising a number of inputs by an entity interacting with a browser during the duration of the session. This collection process is advantageous because it collects raw data from a web session without potentially biasing the input by requiring a user or entity to interact with an input system to generate the data. The collection period of data may be ongoing or may occur periodically during the web session. The input data 105 may include, but is not limited to, mouse cursor position data, motion data, time stamp data, as well as state data that describes the state of the mouse as a function of time. As described in more detail in reference to FIGS. 1-4, the input data 104 may be sessionized to isolate a distinct input session. In some cases, the input data 104 may be an unbounded sequence, for example, collected and stored while the detection system 100 is active. As such, a component of subsystem may bound the input data 104 based on identifying a single session.

At block 510, the detection system 100 generates an output embedding by providing the input sequence to an encoder 108, which has been trained to generate an output embedding from the input sequence. The encoder 108 may be or include an RNN, including LSTM and/or GRU cells, trained to generate a fixed-length embedding from the variable length input sequence. In specific embodiments, the embedding may be or include the hidden state output of a cell of the RNN, such that the embedding includes latent dimensional information which, together with the clustering learned by embedding clusterer subsystem (i.e., embedding clusterer subsystem 340) during training, the cluster membership classifier subsystem 114 has been trained on to distinguish between human interactions and bot interactions.

At block 515, the detection system 100 classifies the embedding according to a cluster membership by predicting a probability distribution. As described in more detail in reference to FIG. 1 and FIG. 4, the classifier may output a vector of probability values that describe the likelihood the input data 104 is attributable to a particular group of similar patterns.

At block 520, the detection system 100 generates a machine-actor score from the probability distribution output by the cluster membership classifier subsystem 114. In various embodiments, the machine-actor score corresponds to a probability that the input data 104, when embedded and clustered, is attributable to a group of similar cluster patterns. For example, the machine-actor score may correspond to the probability of similarity to a group of clustered input displaying a particular repetitive pattern; this in turn indicates the likelihood that the input data is invalid input since repetitive user input behavior is typical of a bot. In more detail, the machine-actor score may be or include the element of the classifier output corresponding to the highest probability value for a class in the clustering, excluding a "largest" cluster found during training, as described previously. Insofar as the machine-actor score captures the likelihood that an input belongs to a group of inputs which have a similar, repetitive pattern, it serves as a proxy for the likelihood that the input was generated by a bot.

At decision block 525, the detection system 100 determines whether the machine-actor score satisfies the threshold value for attributing the input data to bot traffic. In various embodiments, the determination includes a comparison of the machine-actor score to a threshold value and/or threshold range, such that if the score exceeds the threshold value and/or does not fall within the threshold range, the detection system 100 attributes the input data to bot interactions. The threshold may be defined based on input received from a data scientist or client. The threshold may alternatively be determined by using a machine-learning model so as to identify (for example) a threshold value that is optimal with respect to a performance metric (e.g., precision, recall, sensitivity, specificity, accuracy, etc.) or a weighted sum thereof. In some instances, different thresholds are defined for different use cases. In some instances, a different type of model, a different algorithm, and/or a different prioritized performance metric (or combination thereof) may be defined for different use cases.

In various embodiments, the output of the detection system 100 may include a determination as to whether the input data represents human interactions or bot interactions. Additionally or alternatively, the detection system 100 may serve as an intermediate check on one or more interactions, such as a gatekeeping function, to verify interactions before granting access to data targeted by a request. For example, the detection system may process input data, make a suspiciousness determination, and then block or serve the request based on the suspiciousness determination. In this way, the detection system 100 may significantly improve data security and may improve automatic efforts to detect and frustrate automated data access systems.

It will be appreciated that variations of process 500 are contemplated. For example, block 525 indicates that the machine-actor score is compared to a threshold so as to predict whether input data corresponds to bot traffic. In some embodiments, rather than using the machine-actor score to generate a binary prediction (e.g., which may then lead to a binary decision as to whether to grant access requests), the machine-actor scores may be used to prioritize requests. For example, each of multiple requests (e.g., for data access, a processing resource, etc.) may be ranked in a queue in accordance with the machine-actor scores. In some instances, requests associated with low machine-actor scores (e.g., corresponding to predictions that the input is from a human) are prioritized over and positioned closer to the top of a queue relative to requests associated with high machine-actor scores. This approach may facilitate improving experience and performance for users. In some instances, requests associated with high machine-actor scores are prioritized over and positioned closer to the top of a queue relative to requests associated with low machine-actor scores. This approach may facilitate ensuring that important automated processes (e.g., backup generation, security scans, etc.) are reliably performed.

There can also or alternatively be different thresholds that will change the manner in which a response is generated to a machine-actor score. For example, the highest machine-actor scores can be immediately discarded or sent for analysis. Less high, but still significant machine-actor scores may be quarantined, and regular machine-actor scores may be reviewed periodically by a data scientist. Low machine-actor scores can be approved for processing of requests.

In various embodiments, the generated machine-actor score may be further utilized and/or sent to a separate system to determine one or more attributes of the machine-actor score. For example, in some embodiments, the machine-actor score(s) generated can be incorporated as features into a downstream detection/suspiciousness pipeline which draws on multiple signals of different kinds to characterize and validate input sessions. In some embodiments, the scores can be used to aid researchers in knowing which input sessions to investigate more thoroughly; the investigations may include manually inspecting mouse cursor signals and/or other signals from the input session to research individual elements of valid and/or invalid interactions. In some embodiments, the machine-actor score may be used to generate synthetic input data to further refine training datasets for training a generative neural network.

In some embodiments, the determination may operate in real-time (e.g. as a mouse device generates an input for an application). The decision may be updated in real-time based on the incoming inputs and the determination may change based on that real-time update. For example, process 500 may complete steps at blocks 505-525 iteratively over a period of time. The decisions in 525 may be made at the end of the time period, at which point the decision will proceed to either block 530 or 535.

At block 530, where the detection system 100 has determined that the input data was generated by a valid entity, the detection system 100 may forward the request and the output of the detection system 100 to another system for processing, for example, through the network 160 in order to allow additional input. By contrast, where the detection system 100 identifies the input data as invalid interactions, the system may block the request, or may take other actions to identify and prevent the originating system from further access attempts 535, such as forwarding the request and the output of the detection system 100 to another system for processing. In some embodiments, the input may be quarantined in a suspension environment until it can be manually reviewed by an entity, such as a data scientist.

Advantageously, the detection system 100 provides an improved technique for bot interaction detection and/or refusal of requests generated by automated data access systems. In various embodiments, the detection system 100 may be trained to process input data from diverse input modalities, including, but not limited to, touch data, scroll data, mouse cursor trail data, speech/voice inputs, keystrokes, or other computer input data that may be expressed as a sequence. In particular, the detection system 100 provides a robust system that is trainable on a periodic basis, and that can learn to detect bot interactions without explicit reverse engineering of bot interaction algorithms.

Classification Weighing

It will be appreciated that there may be multiple clusters that correspond to bot activity. For example, one cluster may correspond to trail activity that quickly and directly navigates a cursor to a center pixel, whereas another cluster may correspond to clicking a corner pixel in an image. The different types of activity may arise from (for example) different entities having defined rules for bot control, different contexts (e.g., different browser environments with different event firing mechanisms), different time periods, etc. As another example, device types or other types of data characterizing a user device may have different characteristics across clusters. It should be understood that these examples are simplifications which convey the idea that clusters ideally correspond to specific, differentiated bot patterns. In practice, clusters may represent more complex patterns and behaviors which are not easily described or discerned but nonetheless represent bot traffic.

Some disclosures herein relate to predicting whether a given user is a human or a bot. In a purely binary classification instance, each cluster that is associated with any type of bot activity may be characterized as a bot cluster. Then if a given cursor-trail data set is assigned to any of the bot clusters, it can be predicted as being generated by a bot.

However, in some instances there are differences between clusters. For example, clusters may differ with respect to the likelihood that the cluster corresponds to bot activity. So, while multiple clusters may be much more likely to correspond to bot activity or more relative to another cluster or relative to non-clustered data elements, a confidence metric representing a confidence that represented activity corresponds to bot activity may be higher than another. As another example, clusters may vary with respect to a confidence that elements in each cluster correspond to a distinct and uniform type of activity. As yet another example, a content source or other entity may determine that one bot, one type of bot, or one type of bot activity is more undesirable than another bot, another type of bot, or another type of bot activity.

Therefore, a weight may be assigned to each cluster. In some instances, a weight may influence a cluster assignment. The weight may influence cluster assignment, such that a cluster assignment is made by evaluating both an extent to which characteristics of a given cursor trail corresponds to those of a cluster and also the weight of the cluster. Alternatively or additionally, the weight may influence the machine-actor score or a determined threshold (e.g., to determine whether to characterize input activity as coming from a bot or to determine whether to permit a given action). For example, a machine-actor score may be higher or a threshold may be lower when a given cursor trail data set is assigned to a cluster having a higher weight (relative to when a cursor trail data set is assigned to a cluster having a lower weight).

Weights may be reliably assigned to clusters, or they may be assigned in specific instances. Additionally or alternatively, weights may be reliably used (e.g., to potentially influence a cluster assignment, influence a machine-actor score, or influence a threshold), or they may be used only in specific instances. An exemplary specific instance is when an input (representing a cursor trail) does not have a nearest neighbor within a certain radius, when an input is tightly clustered with other known inputs of the same kind, when classification of other nearby inputs is of a certain critical importance, when an input indicates that the cursor trail was generated by a particular type of input device (e.g., mouse, trackpad, keyboard, VR), when an input indicates that the cursor trail was received during a particular time period of the day (e.g., during a night time period), when an input indicates that the cursor trail was originated from a device within a given geographical region (e.g., a given country), etc.

Periodic Sampling

In some instances, rather than evaluating each input data set to predict whether it is from a bot or human (or to generate another type of prediction), periodic sampling may be used to reduce the usage of resources for monitoring. The periodic sampling may result in inputs being monitored during a certain period of time, every nth input being assessed, a random or pseudorandom subset of inputs being assessed, etc.

User Interface and Analytics Dashboard

In some instances, rather than or in addition to using machine-actor scores to (for example) determine whether to process a request, identify a queue placement, or allocate resources, the score may be used for analytics. Specifically, analytics may track how many times or how frequently particular content was viewed, clicked on, etc. The machine-actor scores may be used to distinguish a fraction of the views, clicks, etc. or which views, clicks, etc. were associated with machine-actor scores that may indicate that such instances were due to bot interaction.

For example, a dashboard may show a distribution—across a set of interactions of one or more types (e.g., clicks, views, etc.)—of the machine-actor scores. As another example, a dashboard may identify a percentage of interactions predicted to be attributable to bots. This data may be presented for each of one or more content objects or in aggregate. In some instances, one or more particular cursor-trail data sets are flagged as being particularly suspicious or primed for human review (to determine whether it is to be attributed to a bot or human).

In some instances, a source of the content may have committed to paying another entity for placement of the content in webpages and/or for various types of interactions. Thus, the data in the dashboard may inform the source about the value of the placement and/or potential fraud. Additionally or alternatively, the dashboard may be made available to the other entity, which can use the information to identify strategies for reducing bot interaction (e.g., by influencing decisions as to where—within a webpage—content is to be placed, various frame or Javascript preferences, etc.).

Exemplary Implementation Environment

Figure 6:
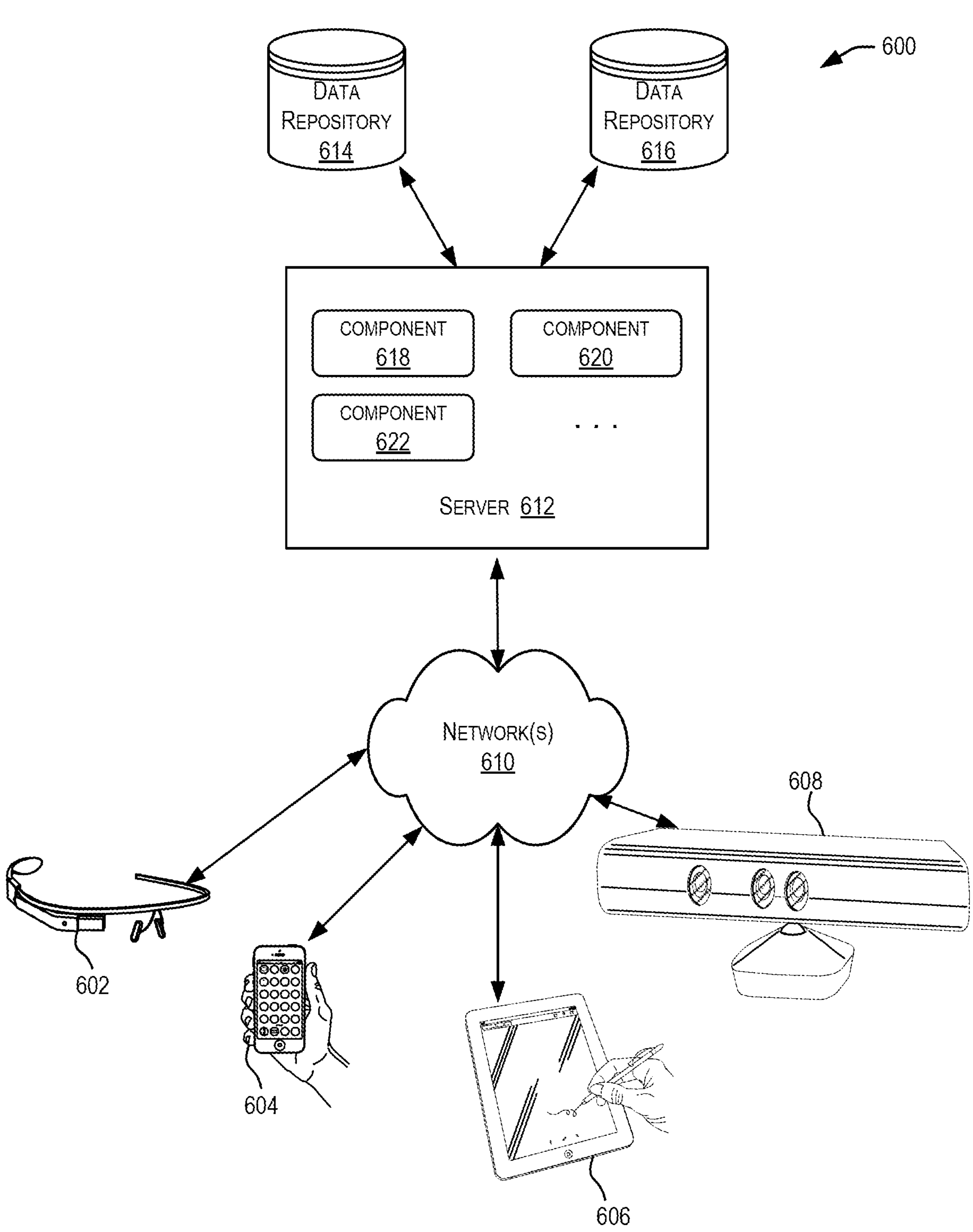
FIG. 6 is a diagram of a distributed system for implementing certain embodiments described herein.

FIG. 6 is a diagram of a distributed system 600 for implementing certain embodiments. In the illustrated embodiment, distributed system 600 includes one or more client computing devices 602, 604, 606, and 608, coupled to a server 612 via one or more communication networks 610. Clients computing devices 602, 604, 606, and 608 may be configured to execute one or more applications.

In various embodiments, server 612 may be adapted to run one or more services or software applications that enable the use of backpropagation to train the cluster membership classifier subsystem 114 of a detection system 100 as described herein. For instance, server 612 may execute some or all aspects of the unsupervised training system 150 or some or all aspects of the detection system 100.

In certain embodiments, server 612 may also provide other services or software applications that can include non-virtual and virtual environments. In various embodiments, these services may be offered as web-based or cloud services, such as under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components. More specifically, for instance, each of client computing devices 602, 604, 606, and/or 608 may be an embedded device configured to execute the detection system 100 and, further, configured to communicate with server 612 to enable server 612 to train the cluster membership classifier subsystem 114 of a detection system 100 through backpropagation as described herein.

In the configuration depicted in FIG. 6, server 612 may include one or more components 618, 620 and 622 that implement the functions performed by server 612. These components may include software components that may be executed by one or more processors, hardware components, or combinations thereof. It should be appreciated that various different system configurations are possible, which may be different from distributed system 600. The embodiment shown in FIG. 6 is thus one example of a distributed system for implementing an embodiment system and is not intended to be limiting.

Users may use client computing devices 602, 604, 606, and/or 608 to interact with aspects of the detection system 100 provided by server 612 in accordance with the teachings of this disclosure. A client device may provide an interface (e.g., a speech interface) that enables a user of the client device to interact with the client device. The client device may also output information to the user via this interface. Although FIG. 6 depicts only four client computing devices, any number of client computing devices may be supported.

The client devices may include various types of computing systems such as PA devices, portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 610 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 610 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization such as one or more flexible pools of logical storage devices that can be virtualized to maintain virtual storage devices for the server. In various embodiments, server 612 may be adapted to run one or more services or software applications that provide the functionality described in the foregoing disclosure.

The computing systems in server 612 may run one or more operating systems including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more data repositories 614, 616. These data repositories may be used to store data and other information in certain embodiments. For example, one or more of data repositories 614, 616 may be used to store training data 210 or other data required to train the cluster membership classifier subsystem 114 of a detection system 100 as described herein. Data repositories 614, 616 may reside in a variety of locations. For example, a data repository used by server 612 may be local to server 612 or may be remote from server 612 and in communication with server 612 via a network-based or dedicated connection. Data repositories 614, 616 may be of different types. In certain embodiments, a data repository used by server 612 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 614, 616 may also be used by applications to store application data. The data repositories used by applications may be of different types such as, for example, a key-value store repository, an object store repository, or a general storage repository supported by a file system.

Figure 7:
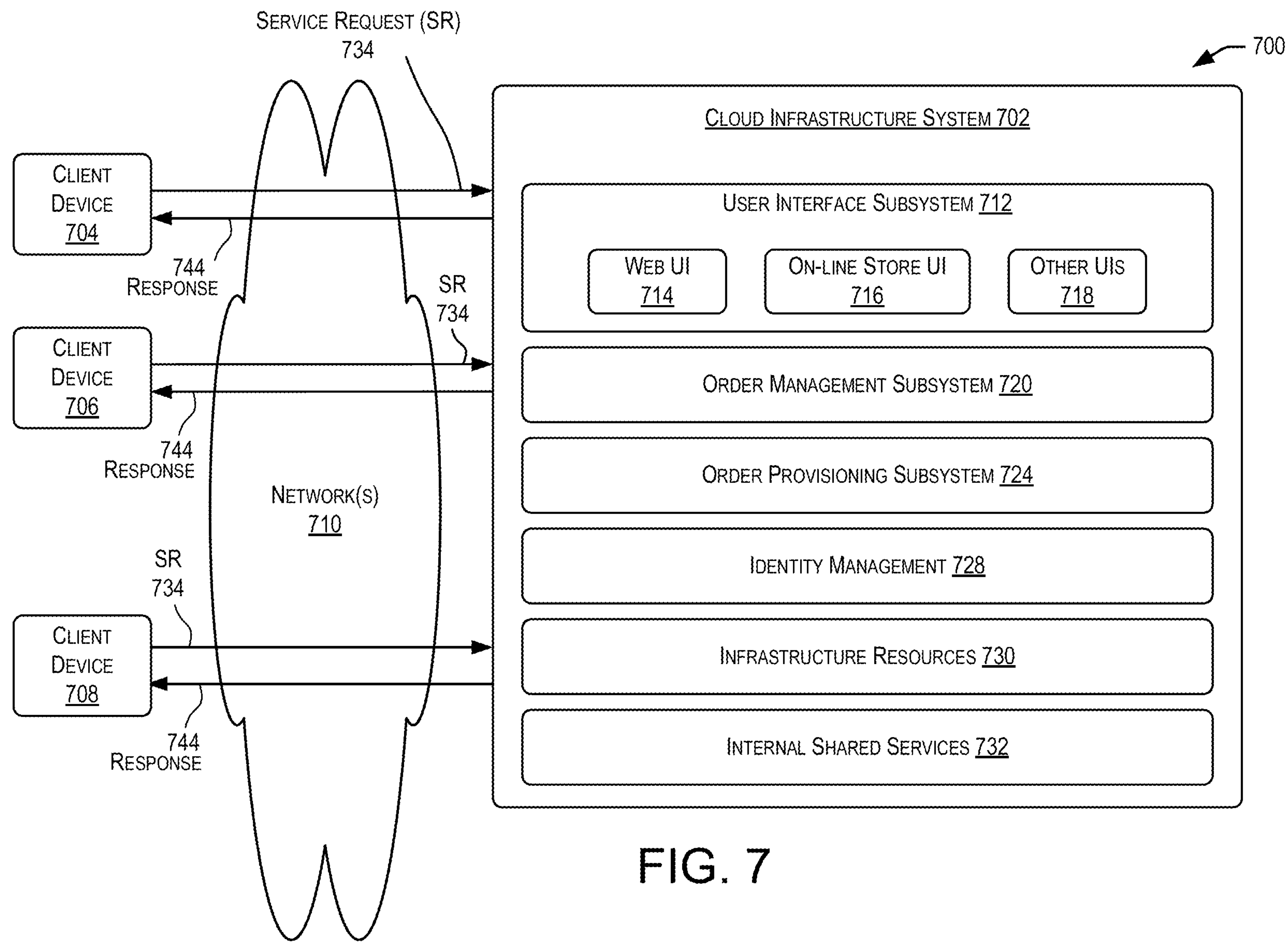
FIG. 7 is a block diagram of a cloud-based system environment, according to certain embodiments described herein.

In certain embodiments, all or a portion of training the cluster membership classifier subsystem 114 of a detection system 100, as described herein, may be offered as services via a cloud environment. FIG. 7 is a block diagram of a cloud-based system environment in which training the cluster membership classifier subsystem 114, as described herein, may be offered at least in part as a cloud service, in accordance with certain embodiments. In the embodiment depicted in FIG. 7, cloud infrastructure system 702 may provide one or more cloud services that may be requested by users using one or more client computing devices 704, 706, and 708. Cloud infrastructure system 702 may comprise one or more computers and/or servers that may include those described above for server 612. The computers in cloud infrastructure system 702 may be organized as general purpose computers, specialized server computers, server farms, server clusters, or any other appropriate arrangement and/or combination.

Network(s) 710 may facilitate communication and exchange of data between client computing devices 704, 706, and 708 and cloud infrastructure system 702. Network (s) 710 may include one or more networks. The networks may be of the same or different types. Network(s) 710 may support one or more communication protocols, including wired and/or wireless protocols, for facilitating the communications.

The embodiment depicted in FIG. 7 is only one example of a cloud infrastructure system and is not intended to be limiting. It should be appreciated that, in some other embodiments, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative embodiments.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the customer's own on-premises servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain embodiments, cloud infrastructure system 702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 702. Cloud infrastructure system 702 then performs processing to provide the services requested in the customer's subscription order. For example, a customer may subscribe to information services or other services provided by the detection system 100 in conversational form. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public customer, where the customer can be an individual or an enterprise. In certain other embodiments, under a private cloud model, cloud infrastructure system 702 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 702 and the services provided may be shared by several organizations in a related community. Various other models such as hybrids of the above mentioned models may also be used.

Client computing devices 704, 706, and 708 may be of different types (such as client computing devices 602, 604, 606, and 608 depicted in FIG. 6) and may be capable of operating one or more client applications. A user may use a client computing device to interact with cloud infrastructure system 702, such as to request a service provided by cloud infrastructure system 702. An attacker may use a client device to send malicious requests.

In various embodiments, the processing performed by cloud infrastructure system 702 may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 702 for providing training of a cluster membership classifier subsystem 114 as described herein. The data used for this analysis may include structured data (e.g., data stored in a database or structured according to a structured model) and/or unstructured data (e.g., data blobs (binary large objects)).

As depicted in the embodiment in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like.

In certain embodiments, to facilitate efficient provisioning of these resources for supporting the various cloud services provided by cloud infrastructure system 702 for different customers, the infrastructure resources 730 may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and that facilitate the provisioning of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users or customers of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a customer may, using a client device, request (service request 734) one or more services provided by cloud infrastructure system 702 using one or more of interfaces 714, 716, and 718. For example, a customer may access the online store, browse cloud services offered by cloud infrastructure system 702, and place a subscription order for one or more services offered by cloud infrastructure system 702 that the customer wishes to subscribe to. The service request may include information identifying the customer and one or more services that the customer desires to subscribe to.

In certain embodiments, such as the embodiment depicted in FIG. 7, cloud infrastructure system 702 may comprise an order management subsystem (OMS) 720 that is configured to process the new order. As part of this processing, OMS 720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 720 may then invoke an order provisioning subsystem (OPS) 724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like.

The allocated pods may then be customized for the particular requesting customer for providing the requested service.

Cloud infrastructure system 702 may send a response or notification 744 to the requesting customer to indicate when the requested service is now ready for use. In some instances, information (e.g., a link) may be sent to the customer that enables the customer to start using and availing the benefits of the requested services.

Cloud infrastructure system 702 may provide services to multiple customers. For each customer, cloud infrastructure system 702 is responsible for managing information related to one or more subscription orders received from the customer, maintaining customer data related to the orders, and providing the requested services to the customer. Cloud infrastructure system 702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 702 may provide services to multiple customers in parallel. Cloud infrastructure system 702 may store information for these customers, including possibly proprietary information. In certain embodiments, cloud infrastructure system 702 comprises an identity management subsystem (IMS) 728 that is configured to manage customers information and provide the separation of the managed information such that information related to one customer is not accessible by another customer. IMS 728 may be configured to provide various security-related services such as identity services, such as information access management, authentication and authorization services, services for managing customer identities and roles and related capabilities, and the like.

Figure 8:
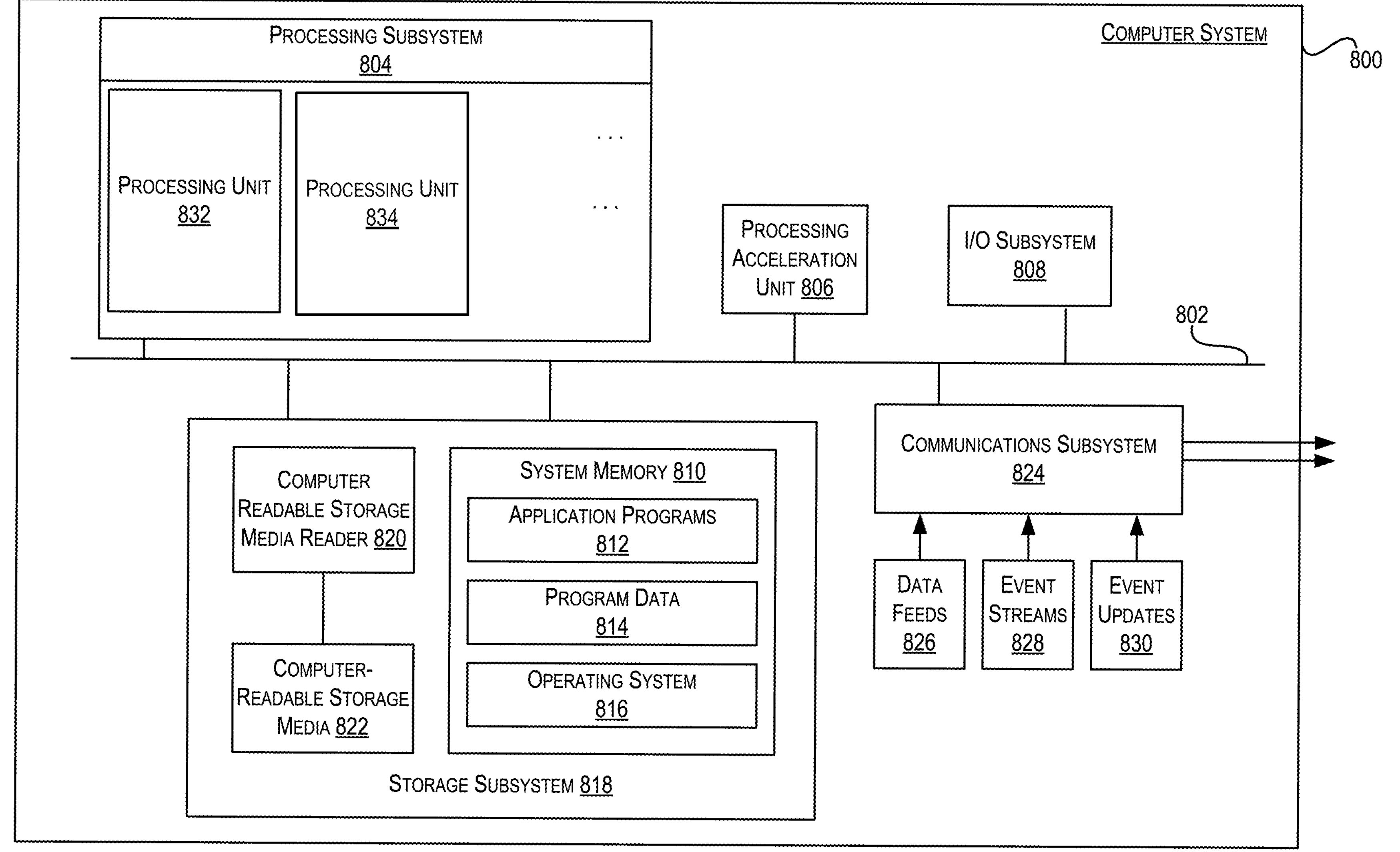
FIG. 8 is a block diagram of an example computer system that may be used to implement certain embodiments described herein.

FIG. 8 is a block diagram of an example computer system 800 that may be used to implement certain embodiments. For example, in various embodiments, computer system 800 may be used to implement any of systems, subsystems, and components described herein. For example, multiple host machines may provide and implement training of the cluster membership classifier subsystem 114 of a detection system 100 as described herein. Computer systems such as computer system 800 may be used as host machines. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 can be organized into one or more processing units 832, 834, etc. A processing unit may include one or more processors, one or more cores from the same or different processors, a combination of cores and processors, or other combinations of cores and processors. In various embodiments, processing subsystem 804 can include one or more special purpose co-processors such as graphics processors, digital signal processors (DSPs), or the like. In various embodiments, some or all of the processing units of processing subsystem 804 can be implemented using customized circuits, such as application specific integrated circuits (ASICs), or field programmable gate arrays (FPGAs).

In various embodiments, the processing units in processing subsystem 804 can execute instructions stored in system memory 810 or on computer-readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above. In instances where computer system 800 is executing one or more virtual machines, one or more processing units may be allocated to each virtual machine.

In certain embodiments, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of various embodiments. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide a repository for storing data used in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

In certain embodiments, software instructions or code implementing training of the cluster membership classifier subsystem 114 of a detection system 100, as described herein, may be executed in system memory 810.

Computer-readable storage media 822 may store programming and data constructs that provide the functionality of various embodiments. Computer-readable storage media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 818 may also include a computer-readable storage media reader 820 that can further be connected to computer-readable storage media 822. Reader 820 may receive and be configured to read data from a memory device such as a disk, a flash drive, etc.

In certain embodiments, computer system 800 may support virtualization technologies, including but not limited to virtualization of processing and memory resources. For example, computer system 800 may provide support for executing one or more virtual machines. In certain embodiments, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In various embodiments communications subsystem 824 can provide wired network connectivity (e.g., Ethernet) in addition to or instead of a wireless interface.

Communication subsystem 824 can receive and transmit data in various forms. For example, in various embodiments, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims. The modifications and/or variations include any relevant combination of the disclosed features.

In accordance with an embodiment, the disclosed features are summarized as follows:

Example 1 is a computer implemented method comprising: obtaining interaction data generated as part of a particular interaction by a user with a computer application; formatting the interaction data into a formatted sequence comprising a bounded sequence of interaction events over time that can be processed by a neural network; inputting the formatted sequence to an encoder model to generate an embedding; inputting the embedding to a classifier model to output a vector of probability values corresponding to a plurality of classes characterizing the embedding; determining a machine-actor score for the particular interaction based at least in part on the vector of probability values, wherein the machine-actor score indicates that the particular interaction is invalid; and outputting the machine-actor score.

Example 2 is the method of any previous or subsequent aspect, wherein the encoder model is trained as part of an autoencoder comprising the encoder model and a decoder model, and wherein the encoder model comprises a recurrent neural network comprising a plurality of gradient recurrent unit cells or long short term memory cells.

Example 3 is the method of any previous or subsequent aspect, wherein the autoencoder is a variational autoencoder configured to learn to output embeddings by sampling them from a Gaussian probability distribution the parameters of which are learned and outputted by the encoder model.

Example 4 is the method of any previous or subsequent aspect, wherein the encoder model is a deep learning transformer model comprising a transformer encoder and a transformer decoder, the transformer encoder configured to transform the formatted sequences into a sequence of intermediate outputs and the transformer decoder configured to decode the intermediate outputs into an output sequence of embeddings.

Example 5 is the method of any previous or subsequent aspect, further comprising clustering, by a clustering model separate from the classifier model, the embedding to form a clustered set of embeddings; and training the classifier model to learn embedding cluster membership probabilities using the embeddings as input features and their corresponding cluster labels from the clustering as labels, to form a trained classifier model; wherein inputting the embedding to a classifier model comprises inputting the embedding into the trained classifier model.

Example 6 is the method of any previous or subsequent aspect, wherein the cluster model and the classifier model are part of a single mixture model.

Example 7 is the method of any previous or subsequent aspect, wherein determining the machine-actor score comprises: identifying a first value of the vector of probability values attributable to a first class; identifying a second value of the vector of probability values attributable to a second class, the second value being a largest value of the vector of probability values other than the first value; and predicting the machine-actor score based at least in part on the second value.

Example 8 is the method of any previous or subsequent aspect, wherein identifying the first value comprises: evaluating a plurality of variance values for a plurality of clusters generated by the classifier model; and attributing a cluster having a largest variance value of the plurality of variance values to the first class.

Example 9 is the method of any previous or subsequent aspect, further comprising: generating a visualization of interaction inputs in embedding space as a two-dimensional projection or a three-dimensional projection possibly with annotations; and presenting the visualization on a computer display so that the embeddings may be qualitatively monitored and acted upon as needed.

Example 10 is the method of any previous or subsequent aspect, wherein the bounded sequence of interaction events comprises a sequence of positional and time deltas generated by differences in positional and temporal elements of an input, respectively, over a period of time.

Example 11 is the method of any previous or subsequent aspect, wherein the bounded sequence further comprises mouse click data corresponding to a sequence of mouse clicks over the period of time.

Example 12 is the method of any previous or subsequent aspect, wherein a first class of the plurality of classes is attributed to human traffic and a second class of the plurality of classes is attributed to bot traffic.

In some examples, a cursor-trail embedding system includes one or more processors; and a non-transitory memory storing computer-executable instructions that, when executed by the one or more processors, cause the one or more processors to perform operations comprising the methods described above.

In some examples, a computer-program product includes a computer-readable storage medium having program instructions embodied thereon, the program instructions executable by one or more processors to cause the one or more processors to perform operations comprising the methods described above.

What is claimed is:

1. A method of detecting automated web traffic, the method comprising:

obtaining interaction data generated as part of a plurality of historical interactions with a plurality of graphical user interface elements to cause a computer application to provide one or more services as a result of application interaction during a plurality of user sessions with the computer application;

formatting the interaction data into a plurality of formatted sequences comprising bounded sequences of interaction events over time that can be processed by a neural network;

generating and storing a plurality of clusters of embeddings comprising embeddings of the plurality of formatted sequences with the plurality of graphical user interface elements during the plurality of user sessions with the computer application;

for each cluster of the plurality of clusters of embeddings, determining a density of embedding values within the cluster; wherein a particular cluster has a particular density of embedding values that is higher than one or more other clusters of the plurality of clusters;

obtaining particular interaction data generated as part of a particular interaction with a particular graphical user interface element to cause the computer application to provide one or more services as a result of application interaction during a particular user session with the computer application;

formatting the particular interaction data into a particular formatted sequence comprising a particular bounded sequence of interaction events over time that can be processed by a neural network;

inputting the particular formatted sequence to an encoder model to generate a particular embedding;

inputting the particular embedding to a classifier model to assign the particular embedding to the particular cluster of the plurality of clusters of embeddings;

based at least in part on the particular density of the particular cluster, determining a machine-actor score for the particular interaction, wherein the machine-actor score corresponds to a prediction that the particular interaction is invalid was machine-generated; and storing the machine-actor score in association with the particular user session; and based at least in part on the machine-actor score, outputting information indicating the particular user session is flagged as having machine-generated input.

2. The method of claim 1, wherein the encoder model is trained as part of an autoencoder comprising the encoder model and a decoder model, and wherein the encoder model comprises a recurrent neural network comprising a plurality of gradient recurrent unit cells or long short term memory cells.

3. The method of claim 2, wherein the autoencoder is a variational autoencoder configured to learn to output embeddings by sampling from a Gaussian probability distribution, parameters of which are learned and outputted by the encoder model.

4. The method of claim 1, wherein the encoder model is a deep learning transformer model comprising a transformer encoder and a transformer decoder, the transformer encoder configured to transform the formatted sequences into a sequence of intermediate outputs and the transformer decoder configured to decode the intermediate outputs into an output sequence of embeddings.

5. The method of claim 1, wherein the generating and storing the plurality of clusters comprises using a clustering model separate from the classifier model, the method further comprising:

training the classifier model to learn embedding cluster membership probabilities using the embeddings as input features and their corresponding cluster labels from the clustering as labels, to form a trained classifier model;

wherein inputting the particular embedding to a classifier model comprises inputting the particular embedding into the trained classifier model.

6. The method of claim 1, wherein determining the machine-actor score comprises:

identifying a first value of a vector of probability values attributable to a first class;

identifying a second value of the vector of probability values attributable to a second class, the second value being a largest value of the vector of probability values other than the first value; and predicting the machine-actor score based at least in part on the second value.

7. The method of claim 6, wherein identifying the first value comprises:

evaluating a plurality of variance values for a plurality of clusters generated by the classifier model; and attributing a cluster having a largest variance value of the plurality of variance values to the first class.

8. The method of claim 1, further comprising:

generating a visualization of interaction inputs in embedding space as a two-dimensional projection or a three-dimensional projection with annotations; and causing display of the visualization on a user interface that includes options for monitoring and acting upon flagged user sessions.

9. The method of claim 1, wherein the bounded sequence of interaction events comprises a sequence of positional and time deltas generated by differences in positional and temporal elements of an input, respectively, over a period of time.

10. The method of claim 9, wherein the bounded sequence further comprises mouse click data corresponding to a sequence of mouse clicks over the period of time.

11. The method of claim 1, wherein a first class of a plurality of classes is attributed to human traffic and a second class of the plurality of classes is attributed to bot traffic.

12. The method of claim 1, wherein a collection period for the obtaining the particular interaction data is ongoing during the particular user session; wherein each of the plurality of historical interactions with the plurality of graphical user interface elements comprise interactions with a first graphical user interface element and one or more additional graphical user interface elements of the computer application, and wherein the particular interaction with the particular graphical user interface element comprises an interaction with the particular graphical user interface element and one or more additional graphical user interface elements of the computer application.

13. An automated web traffic detection system, comprising:

one or more processors;

a non-transitory memory storing computer-executable instructions that, when executed by the one or more processors, cause the one or more processors to perform operations comprising:

obtaining interaction data generated as part of a plurality of historical interactions with a plurality of graphical user interface elements to cause a computer application to provide one or more services as a result of application interaction during a plurality of user sessions with the computer application;

formatting the interaction data into a plurality of formatted sequences comprising bounded sequences of interaction events over time that can be processed by a neural network;

generating and storing a plurality of clusters of embeddings comprising embeddings of the plurality of formatted sequences with the plurality of graphical user interface elements during the plurality of user sessions with the computer application;

for each cluster of the plurality of clusters of embeddings, determining a density of embedding values within the cluster; wherein a particular cluster has a particular density of embedding values that is higher than one or more other clusters of the plurality of clusters;

obtaining particular interaction data generated as part of a particular interaction with a particular graphical user interface element to cause the computer application to provide one or more services as a result of application interaction during a particular user session with the computer application;

formatting the particular interaction data into a particular formatted sequence comprising a particular bounded sequence of interaction events over time that can be processed by a neural network;

inputting the particular formatted sequence to an encoder model configured to generate a particular embedding;

generating, as an output of the encoder model, the particular embedding;

inputting the particular embedding to a classifier model configured to assign the particular embedding to the particular cluster of the plurality of clusters of embeddings;

based at least in part on the particular density of the particular cluster, determining a machine-actor score for the particular interaction, wherein the machine-actor score corresponds to a prediction that the particular interaction was machine-generated; and storing the machine-actor score in association with the particular user session; and based at least in part on the machine-actor score, outputting information indicating the particular user session is flagged as having machine-generated input.

14. The system of claim 13, wherein the encoder model is trained as part of an autoencoder comprising the encoder model and a decoder model, and wherein the encoder model comprises a recurrent neural network comprising a plurality of gradient recurrent unit cells or long short term memory cells.

15. The system of claim 13, wherein the generating and storing the plurality of clusters comprises using a clustering model separate from the classifier model, the operations further comprising:

training the classifier model using plurality of clusters of embeddings to form a trained classifier model;

wherein inputting the embedding to a classifier model comprises inputting the particular embedding into the trained classifier model.

16. The system of claim 13, wherein determining the machine-actor score comprises:

identifying a first value of a vector of probability values attributable to a first class;

identifying a second value of the vector of probability values attributable to a second class, the second value being a largest value of the vector of probability values other than the first value; and predicting the machine-actor score based at least in part on the second value.

17. The system of claim 16, wherein identifying the first value comprises:

evaluating a plurality of variance values for a plurality of clusters generated by the classifier model; and attributing a cluster having a largest variance value of the plurality of variance values to a first class of a plurality of classes.

18. The system of claim 13, wherein the computer-executable instructions, when executed by the one or more processors, further cause the one or more processors to perform operations comprising:

generating a visualization of interaction inputs in embedding space as a two-dimensional projection or a three-dimensional projection with annotations; and causing display of the visualization on a user interface that includes options for monitoring and acting upon flagged user sessions.

19. The system of claim 13, wherein the bounded sequence of interaction events comprises a sequence of positional and time deltas generated by differences in positional elements of an input over a period of time.

20. The system of claim 13, wherein a collection period for the obtaining the particular interaction data is ongoing during the particular user session; wherein each of the plurality of historical interactions with the plurality of graphical user interface elements comprise interactions with a first graphical user interface element and one or more additional graphical user interface elements of the computer application, and wherein the particular interaction with the particular graphical user interface element comprises an interaction with the particular graphical user interface element and one or more additional graphical user interface elements of the computer application.

21. A computer-program product, the computer-program product comprising a computer-readable storage medium having program instructions embodied thereon, the program instructions executable by one or more processors to cause the one or more processors to perform operations comprising:

obtaining interaction data generated as part of a plurality of historical interactions with a plurality of graphical user interface elements to cause a computer application to provide one or more services as a result of application interaction during a plurality of user sessions with the computer application;

formatting the interaction data into a plurality of formatted sequences comprising bounded sequences of interaction events over time that can be processed by a neural network;

generating and storing a plurality of clusters of embeddings comprising embeddings of the plurality of formatted sequences with the plurality of graphical user interface elements during the plurality of user sessions with the computer application;

for each cluster of the plurality of clusters of embeddings, determining a density of embedding values within the cluster; wherein a particular cluster has a particular density of embedding values that is higher than one or more other clusters of the plurality of clusters;

obtaining particular interaction data generated as part of a particular interaction with a particular graphical user interface element to cause the computer application to provide one or more services as a result of application interaction during a particular user session with the computer application;

formatting the particular interaction data into a particular formatted sequence comprising a particular bounded sequence of interaction events over time that can be processed by a neural network;

inputting the particular formatted sequence to an encoder model configured to generate a particular embedding;

generating, as an output of the encoder model, the particular embedding;

inputting the particular embedding to a classifier model configured to assign the particular embedding to the particular cluster of the plurality of clusters of embeddings;

based at least in part on the particular density of the particular cluster, determining a machine-actor score for the particular interaction, wherein the machine-actor score corresponds to a prediction that the particular interaction was machine-generated; and storing the machine-actor score in association with the particular user session; and based at least in part on the machine-actor score, outputting information indicating the particular user session is flagged as having machine-generated input. obtaining interaction data generated as part of a user interacting with a computer application;

formatting the interaction data as a bounded sequence of interaction events over time that can be modeled by a neural network to form formatted sequences;

inputting the formatted sequences to an encoder model configured to generate an embedding from the bounded sequence;

generating, as an output of the encoder model, an embedding;

inputting the embedding to a classifier model configured to predict a vector of probability values corresponding to a plurality of classes using the embedding;

predicting, as an output of the classifier model, the vector of probability values;

determining a machine-actor score for the interaction from the vector of probability values; and outputting the machine-actor score.

22. The computer-program product of claim 21, wherein a collection period for the obtaining the particular interaction data is ongoing during the particular user session; wherein each of the plurality of historical interactions with the plurality of graphical user interface elements comprise interactions with a first graphical user interface element and one or more additional graphical user interface elements of the computer application, and wherein the particular interaction with the particular graphical user interface element comprises an interaction with the particular graphical user interface element and one or more additional graphical user interface elements of the computer application.

* * * * *